(12) United States Patent
Kim et al.

(10) Patent No.: US 10,319,345 B2
(45) Date of Patent: Jun. 11, 2019

(54) PORTABLE TERMINAL AND METHOD FOR PARTIALLY OBFUSCATING AN OBJECT DISPLAYED THEREON

(71) Applicant: Samsung Electronics Co., Ltd., Gyeonggi-do (KR)

(72) Inventors: Ji-Hoon Kim, Seoul (KR); Won-Suk Chang, Gyeonggi-do (KR); Do-Hyeon Kim, Gyeonggi-do (KR); Sang-Ho Kim, Gyeonggi-do (KR); Hee-Bum Ahn, Seoul (KR); Seong-Taek Hwang, Gyeonggi-do (KR); Dong-Wook Kwon, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 725 days.

(21) Appl. No.: 14/259,740

(22) Filed: Apr. 23, 2014

(65) Prior Publication Data

US 2014/0327634 A1    Nov. 6, 2014

(30) Foreign Application Priority Data

May 2, 2013  (KR) .................. 10-2013-0049291
Apr. 14, 2014  (KR) .................. 10-2014-0044006

(51) Int. Cl.
*G06F 3/0488*  (2013.01)
*G06F 21/50*  (2013.01)
(Continued)

(52) U.S. Cl.
CPC ............ *G09G 5/30* (2013.01); *G06F 3/0488* (2013.01); *G06F 21/50* (2013.01); *G09G 3/20* (2013.01);
(Continued)

(58) Field of Classification Search
CPC ....................................... G09G 5/30
See application file for complete search history.

(56) References Cited

U.S. PATENT DOCUMENTS 4,868,765 A * 9/1989 Diefendorff ............ G09G 5/14
345/537
5,781,662 A * 7/1998 Mori .................. G06F 3/04883
382/186

(Continued)

FOREIGN PATENT DOCUMENTS

CN     101557430     10/2009
CN     102541443      7/2012
(Continued)

OTHER PUBLICATIONS

European Summons to Attend Oral Proceedings dated Mar. 23, 2017 issued in counterpart application No. 14166857.4-1914, 6 pages.

(Continued)

*Primary Examiner* — Chanh D Nguyen
*Assistant Examiner* — Karin Kiyabu
(74) *Attorney, Agent, or Firm* — The Farrell Law Firm, P.C.

(57) ABSTRACT

A portable terminal and a method for protecting a displayed object on a screen of a portable terminal are provided. The method includes detecting an input on the screen; forming an area corresponding to a position of the detected input; and displaying a part of an object corresponding to the formed area differently from another part of the object in an area outside of the formed area.

17 Claims, 13 Drawing Sheets

(51) Int. Cl.
*G09G 3/20* (2006.01)
*G09G 5/37* (2006.01)
*G09G 5/30* (2006.01)

(52) U.S. Cl.
CPC ......... *G09G 5/37* (2013.01); *G06F 2221/032* (2013.01); *G06F 2221/2105* (2013.01); *G09G 2320/066* (2013.01); *G09G 2320/0686* (2013.01); *G09G 2358/00* (2013.01)

(56) References Cited

U.S. PATENT DOCUMENTS

| | | | |
|---|---|---|---|
| 5,801,697 | A | 9/1998 | Parikh et al. |
| 9,235,711 | B1* | 1/2016 | Xavier .................. G06T 11/60 |
| 9,411,484 | B2* | 8/2016 | Park ...................... G06F 3/0481 |
| 9,423,901 | B2* | 8/2016 | Bustamante .......... G06F 3/0412 |
| 9,671,946 | B2* | 6/2017 | Patel .................... G06F 3/04847 |
| 9,875,566 | B2* | 1/2018 | Ahuja ..................... G06T 11/60 |
| 2003/0043189 | A1* | 3/2003 | Rieffel ................. G06F 3/04883 715/753 |
| 2003/0179201 | A1* | 9/2003 | Thacker ............... G06F 3/0481 345/441 |
| 2004/0085364 | A1* | 5/2004 | Keely ................... G06F 3/0483 715/804 |
| 2006/0132460 | A1* | 6/2006 | Kolmykov-Zotov ....................... G06F 3/04812 345/173 |
| 2006/0158460 | A1* | 7/2006 | Uh .......................... G06F 21/84 345/619 |
| 2006/0284852 | A1* | 12/2006 | Hofmeister ........... G06F 3/0483 345/173 |
| 2009/0158191 | A1* | 6/2009 | Varanda ............... G06F 3/0481 715/773 |
| 2009/0225100 | A1 | 9/2009 | Lee et al. |
| 2009/0256814 | A1* | 10/2009 | Chung .................. G06F 1/3215 345/173 |
| 2009/0289914 | A1* | 11/2009 | Cho ......................... G06F 3/044 345/173 |
| 2009/0303199 | A1* | 12/2009 | Cho ..................... G06F 3/04845 345/173 |
| 2012/0098850 | A1* | 4/2012 | Narita .................. G06F 3/0488 345/589 |
| 2012/0127192 | A1 | 5/2012 | Cheong et al. |
| 2012/0287300 | A1* | 11/2012 | Edwards ............. G06F 3/04845 348/222.1 |
| 2013/0162667 | A1* | 6/2013 | Eskolin ................ G06F 3/0488 345/619 |
| 2013/0194301 | A1* | 8/2013 | Robbins ................. G06F 21/60 345/629 |
| 2013/0275763 | A1 | 10/2013 | Lee et al. |
| 2013/0293490 | A1* | 11/2013 | Ward .................... G06F 3/0488 345/173 |
| 2014/0078172 | A1* | 3/2014 | Systrom .................. G06T 5/002 345/629 |
| 2014/0118272 | A1* | 5/2014 | Gunn .................... G06F 3/0488 345/173 |
| 2014/0283100 | A1* | 9/2014 | Harrison ............. G06F 21/6245 726/26 |
| 2015/0082255 | A1* | 3/2015 | DeVries ............... G06F 3/0488 715/863 |
| 2015/0082446 | A1* | 3/2015 | Flowers ................ G06F 3/0488 726/26 |
| 2015/0220262 | A1* | 8/2015 | Patel .................... G06F 3/04847 715/863 |
| 2015/0317482 | A1* | 11/2015 | Blaisdell .............. G06F 3/0484 726/26 |
| 2016/0154769 | A1* | 6/2016 | Ikeda .................... G06Q 10/101 715/268 |
| 2016/0309321 | A1* | 10/2016 | Song .................... G06F 3/0488 |
| 2017/0075561 | A1* | 3/2017 | Ghazanfari ........... G09G 5/377 |

FOREIGN PATENT DOCUMENTS

| | | |
|---|---|---|
| CN | 103092322 | 5/2013 |
| EP | 1 681 841 | 7/2006 |
| KR | 100765953 | 10/2007 |
| KR | 1020130115742 | 10/2013 |
| WO | WO 99/47990 | 9/1999 |

OTHER PUBLICATIONS

Chinese Office Action dated Nov. 5, 2018 issued in counterpart application No. 201410185091.0, 15 pages.

* cited by examiner

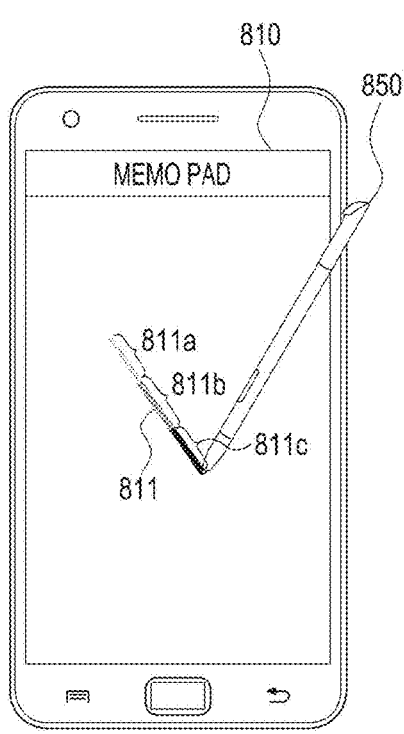 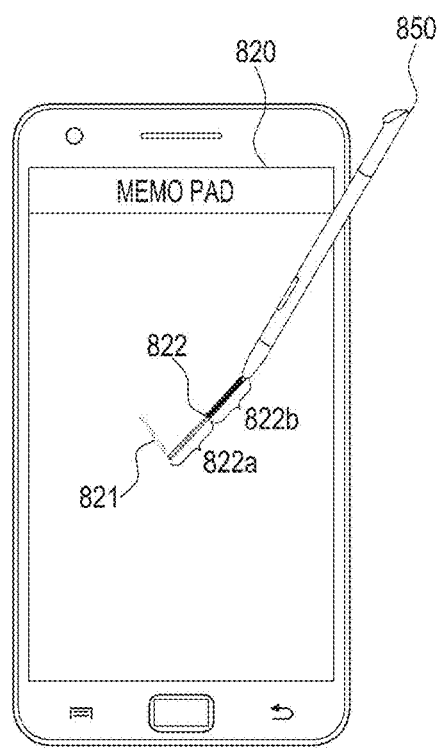
FIG.8A  FIG.8B
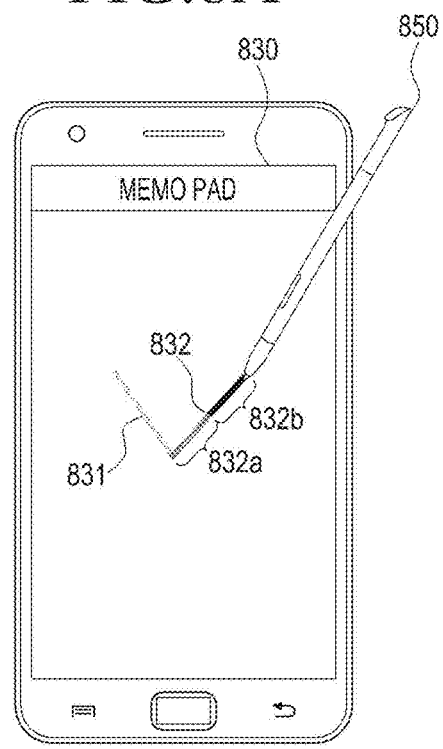 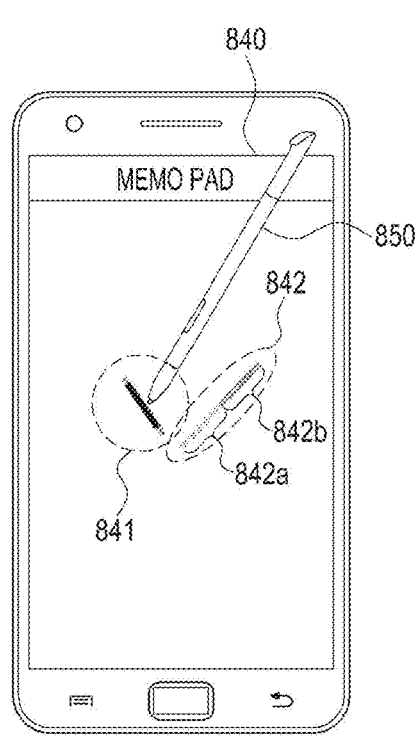
FIG.8C  FIG.8D

PORTABLE TERMINAL AND METHOD FOR PARTIALLY OBFUSCATING AN OBJECT DISPLAYED THEREON

PRIORITY

This application claims priority under 35 U.S.C. § 119(a) to Korean Application Serial Nos. 10-2013-0049291 and 10-2014-0044006, which were filed in the Korean Intellectual Property Office on May 2, 2013 and Apr. 14, 2014, respectively, the entire content of each of which is hereby incorporated by reference.

BACKGROUND

1. Field of the Invention

The present disclosure relates to a portable terminal, and more particularly to a portable terminal and a method for controlling a screen to protect a displayed object.

2. Description of the Related Art

With the widespread use of portable terminals, users have become accustomed to using their portable terminals without regard to time and place. Further, with the increased popularity and conveniences of touch screen portable terminals, user demands to produce and share content are also gradually increasing. Additionally, screen sizes of the portable terminals have gradually increased to display and construct various content.

However, existing technologies for protecting displayed content from other people are insufficient for these larger screen portable terminals, potentially exposing users' information to other people.

SUMMARY

The present invention is designed to address at least the problems and/or disadvantages described above and to provide at least the advantages described below.

Accordingly, an aspect of the present invention is to protect a screen of a portable terminal from unwanted viewing by others.

Another aspect of the present invention is to maintain security of displayed content by brightly displaying only a required partial area of the screen and dimly displaying the remaining areas. For example, when an object is being made or is displayed on the screen, the screen may be controlled to make written contents disappear or to blurredly display the contents, or data may be output to a partial area of the screen, without outputting the data to the remaining areas, thereby minimizing exposure of the content.

In accordance with an aspect of the present invention, a method is provided for protecting a displayed object on a screen of a portable terminal. The method includes detecting an input on (or through) the screen; forming an area corresponding to a position of the detected input; and displaying a part of an object corresponding to the formed area differently from another part of the object in an area outside of the formed area.

In accordance with another aspect of the present invention, a method is provided for protecting a displayed object on a screen of a portable terminal. The method includes detecting an input on the screen; displaying a trace formed in response to the detected input on the screen; and controlling the display of the trace such that the displayed trace sequentially disappears.

In accordance with another aspect of the present invention, a method is provided for protecting a displayed object on a screen of a portable terminal. The method includes detecting an input on the screen displaying at least one object; and forming an area for controlling an attribute of the screen, based on a position at which the input is detected.

In accordance with another aspect of the present invention, a portable terminal is provided, which includes a screen configured to detect an input; and a controller configured to form an area corresponding to a position of the detected input, and to display a part of an object corresponding to the formed area differently from another part of the object in an area outside of the formed area.

In accordance with another aspect of the present invention, a computer-readable storage medium for storing a program for a processor to protect an object displayed on a screen, which when executed by the processor, performs the operations including detecting an input on the screen; forming an area corresponding to a position of the detected input; and displaying a part of an object corresponding to the formed area differently from another part of the object in an area outside of the formed area.

BRIEF DESCRIPTION OF THE DRAWINGS

The above and other aspects, features, and advantages of certain embodiments of the present invention will be more apparent from the following detailed description taken in conjunction with the accompanying drawings, in which:

FIG. 8A illustrates an example of inputting a trace into a screen of a portable terminal according to an embodiment of the present invention;

FIG. 8B illustrates an example of controlling to make a trace input into a screen of a portable terminal sequentially disappear after a predetermined time according to an embodiment of the present invention;

FIG. 8C illustrates another example of controlling to make a trace input into a screen of a portable terminal sequentially disappear after a predetermined time according to an embodiment of the present invention;

FIG. 8D illustrates an example of controlling a display of a disappearing trace in response to an input of a touch or a hovering on a trace input into a screen of a portable terminal according to an embodiment of the present invention;

DETAILED DESCRIPTION

Figure 1:
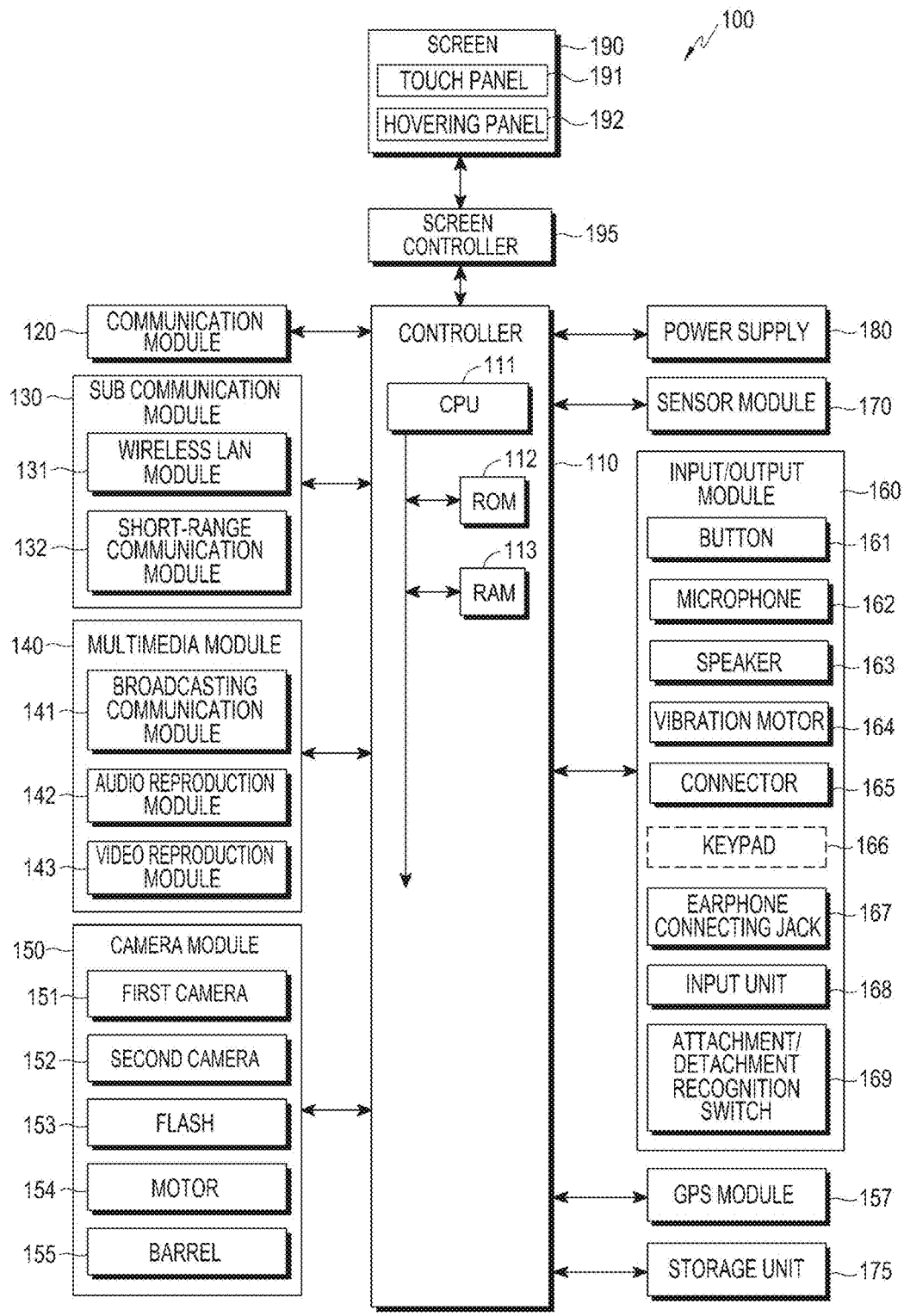
FIG. 1 is a block diagram illustrating a portable terminal according to an embodiment of the present invention.

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Although the terms including an ordinal number such as first, second, etc. can be used for describing various elements, the elements are not restricted by the terms. The terms are only used to distinguish one element from another element. For example, without departing from the scope of the present invention, a first structural element may be named a second structural named. Similarly, the second structural element also may be named the first structural element. As used herein, the term "and/or" includes any and all combinations of one or more of the associated listed items.

The terms used in this application is for the purpose of describing particular embodiments only and is not intended to limit the disclosure. Singular forms are intended to include plural forms unless the context clearly indicates otherwise. In the description, it should be understood that the terms "include" or "have" indicate existences of a feature, a number, a step, an operation, a structural element, parts, or a combination thereof, and do not previously exclude the existences or probability of addition of one or more another features, numeral, steps, operations, structural elements, parts, or combinations thereof.

Unless defined differently, all terms used herein, which include technical terminologies or scientific terminologies, have the same meaning as a person skilled in the art to which the present disclosure belongs. It should be interpreted that the terms, which are identical to those defined in general dictionaries, have the meaning identical to that in the context of the related technique. The terms should not be ideally or excessively interpreted as a formal meaning.

Terms to be used in the present disclosure will be defined as follows.

Portable terminal: a mobile terminal that is portable and provides data transmission/reception and a voice and video call, and may include at least one screen (or at least one touch screen). Examples of a portable terminal include a smart phone, a tablet Personal Computer (PC), a 3-Dimensional (3D)-TeleVision (TV), a smart TV, a Light Emitting Diode (LED) TV, and a Liquid Crystal Display (LCD) TV, and any other terminal that can communicate with a neighboring device or another terminal located at a remote place.

Input device: at least one of an electronic pen, and a stylus pen that can provide a command or an input to the portable terminal in a screen contact state or even in a non-contact state, such as hovering.

Object: something which is displayed or can be displayed on a screen of a portable terminal Examples of an object include a document, a writing, a widget, a picture, a map, a dynamic image, an email, a Short Message Service (SMS) message, a Multimedia Messaging Service (MMS) message, a shortcut icon, a thumbnail image, a folder storing at least one object in the portable terminal etc. Accordingly, the object may be executed, deleted, canceled, stored, or changed by a touch input or hovering input using the input device.

FIG. 1 is a block diagram schematically illustrating a portable terminal according to an embodiment of the present invention.

Referring to FIG. 1, a portable terminal 100 may be connected with an external device (not shown) by using one of a mobile communication module 120, a sub-communication module 130, a connector 165, and an earphone connecting jack 167. The external device may include various devices detached from and attached to the portable terminal 100 by a wire, such as an earphone, an external speaker, a Universal Serial Bus (USB) memory, a charger, a cradle/dock, a Digital Multimedia Broadcasting (DMB) antenna, a mobile payment related device, a health management device (blood sugar tester or the like), a game machine, a car navigation device and the like. Further, the external device may include a Bluetooth communication device, a Near Field Communication (NFC) device, a WiFi Direct communication device, and a wireless Access Point (AC) which can wirelessly access a network. The portable terminal may be connected with other devices, e.g., a mobile phone, a smart phone, a tablet PC, a desktop PC, and a server in a wired or wireless manner.

Referring to FIG. 1, the portable terminal 100 includes at least one screen 190, at least one screen controller 195, a controller 110, a mobile communication module 120, a sub-communication module 130, a multimedia module 140, a camera module 150, a Global Positioning System (GPS) module 157, an input/output module 160, a sensor module 170, a storage unit 175, and a power supply unit 180. The portable terminal 100 according to the present disclosure can protect an object displayed on the screen 190 through at least one device or module which has been described above.

The sub communication module 130 includes a wireless Local Area Network (LAN) module 131, a short range communication module 132. The multimedia module 140 includes a broadcasting communication module 141, an audio reproduction module 142, and a video reproduction module 143.

The camera module 150 includes a first camera 151 and a second camera 152. Further, the camera module 150 includes a barrel 155 for zooming in/zooming out the first and/or second cameras 151 and 152, a motor 154 for controlling a motion of the barrel 155 to zoom in/zoom out the barrel 155, and a flash 153 for providing a light source for photographing according to a main purpose of the portable terminal 100.

The input/output module 160 includes a button 161, a microphone 162, a speaker 163, a vibration motor 164, a connector 165, and a keypad 166.

The controller 110 includes a Central Processing Unit (CPU) 111, a Read Only Memory (ROM) 112 which stores control programs for controlling the user terminal 100, and a Random Access Memory (RAM) 113 which stores signals or data input from the outside of the portable terminal 100 or is used as a memory region for an operation executed in the portable terminal 100. For example, the CPU 111 may include a single core, a dual core, a triple core, or a quadruple core. The CPU 111, the ROM 112 and the RAM 113 may be connected to each other through internal buses.

The controller 110 controls the mobile communication module 120, the sub communication module 130, the multimedia module 140, the camera module 150, the GSP module 157, the input/output module 160, the sensor module 170, the storage unit 175, the power supplier 180, the screen 190, and the screen controller 195.

Further, the controller 110 determines whether the hovering is recognized, when an input device 168, such as an electronic pen, approaches an object displayed on the screen 190 and identifies the object corresponding to a position where the hovering occurs. The controller 110 detects a distance between the portable terminal 100 and the input unit and the hovering according to the distance. The hovering may include at least one of a press of a button formed on the input unit, a tap on the input unit, a movement of the input unit at a speed faster than a predetermined speed, and a touch of the object.

When an input using a touch or a hovering is detected on the screen 190, the controller 110 may form an area corresponding to a position of the detected input to protect a displayed object and display a part of the object corresponding to the formed area differently from other parts of the object corresponding to other areas. For example, the controller 110 may control such that a display within the area is different from a display in other areas, and control a partial area of the screen 190. The controller 110 may control a display within the area by applying different attributes to the area and other areas to display an object output in the area different from an object output in at least a part of the other areas except for the area. The attribute may include at least one of a size, a color, a brightness, and a gradation effect. Further, the area may be differently controlled according to a touched position or a distance between a finger or an input unit performing the input and the screen 190. The object output within the area and the object output within the other areas may be differently controlled according to a touched position or a distance between a finger and/or an input unit performing the input and the screen 190. The object or a part of the object output within the area may be more brightly output than the object or a part of the object output within the other areas.

When the input is a touch, the area may be formed with a predetermined radius from the touch position.

When the input is a hovering, a size of the area may be variably controlled according to a distance between a position where the hovering is detected and the screen 190 detecting the input.

Further, the screen 190 may include a layer for controlling a display of a displayed object. The layer may be a virtual layer which can be implemented by software. The controller 110 may control a display of the object displayed on the screen 190 by controlling the layer. Another area may include at least partial areas except for the area. When an input is detected while an object is displayed on the screen 190, the controller 110 may transparently display the area and display the other areas more translucently than the area or opaquely. When an input is detected while an object (for example, picture) is displayed, the controller 110 may control a color of a part of the object to be different from a color of other parts of the object. An area having a predetermined radius from the touch position may be formed, when the input is the touch input, and an area may be formed based on a distance between a position where the hovering is detected and the screen 190, when the input is the hovering input, under a control of the controller 110. A position of the area may be changed in accordance with a movement of the input.

When a touch input or a hovering input is detected on the screen 190, the controller 110 may display a trace formed in response to the detected input to protect a displayed object, and control the display such that the displayed trace sequentially disappears. For example, the displayed trace may sequentially disappear according to an input time. That is, the controller 110 may control the screen 190, such that a formed trace sequentially disappears a predetermine time after first being displayed.

The controller 110 may control a Red, Green, and Blue (RGB) value applied to each pixel of the trace to make the trace sequentially disappear. Further, when a touch input or a hovering input is detected on the disappearing trace, the controller 110 may re-display the disappearing trace in response to the detection of the input.

A gradation effect may be applied to the translucently or opaquely displayed trace.

The controller 110 may form an area to display the disappearing trace, based on a position at which the touch or hovering input is detected, and display the disappearing trace on the formed area. The translucently or opaquely displayed trace may be included in an area formed, based on a position at which the input is detected or a distance from a position where the hovering is detected to the screen 190.

Further, the controller 110 may control the screen 190 such that the partial area is more brightly displayed than the other areas in response to an input of writing using the touch or the hovering. When a touch or hovering input is detected on the screen 190 displaying an object, the controller 110 may apply an object attribute, which is different from an object attribute applied to the other areas except for the area, to the area formed in response to the detected input. The controller 110 may change the attribute of at least one of the area and the other areas. The attribute may include at least one of a size, a color, and a gradation effect. At least one of the size and the object output of the partial area may be controlled in response to the touch or hovering input, and the partial area may be formed based on a position at which the input received or a position having a shortest distance from a position at which the hovering is detected.

A display of the object may be controlled in accordance with a security mode in which the display of the object is controlled. The security mode may be configured using at least one of a current position of the portable terminal, a time, an ambient situation, and ambient brightness, or may be configured by a selection by the user. Further, the security mode may configure at least one of a size of the partial area, an object output, and a time at which a trace input by a touch or a hovering is sequentially transparent or translucent. In addition, the security mode may be automatically configured through pieces of information collected by various sensors included in the portable terminal. The aforementioned input according to the present disclosure may include at least one of a touch and a hovering, and a shape of the partial area may be variably controlled.

The controller 110 may detect at least one input of a touch and a hovering on the screen 190 displaying at least one object and form an area for controlling an attribute of the screen 190, based on a position at which the input is detected. The controller 110 may control the screen 190 such that an object within the formed area is more brightly displayed than an object within at least a partial area of the other areas.

The controller 110 may control a display of the object displayed on the screen 190 by using an input detected on the screen 190.

The screen 190 may include at least two or more layers. For example, a first layer of the at least two layers may display an object and a second layer may form the area. An attribute of the second layer may be controlled in accordance with at least one of a position at which the input is detected and a distance of the hovering, and may exist on the first layer.

Further, in accordance with an embodiment of the present invention, the second layer may exist below the first layer. The controller 110 may control the attribute of the formed area differently from the attribute of the other areas on the screen 190. The attribute may include at least one of a color of a part of the object displayed within the area, a brightness of the area, and a gradation effect applied to a boundary between the area and the other areas outside of the area.

The mobile communication module 120 connects the portable terminal 100 to the external device through mobile communication by using one or more antennas according to a control of the controller 110. The mobile communication module 120 transmits/receives a wireless signal for a voice call, a video call, a SMS, or a Multimedia Message Service (MMS) to/from a mobile phone (not illustrated), a smart phone (not illustrated), a tablet PC, or another device (not illustrated), which has a phone number input into the portable terminal 100.

The sub-communication module 130 includes the wireless LAN module 131 and the short-range communication module 132. Alternatively, the sub-communication module 130 may include only the wireless LAN module 131, or only the short-range communication module 132.

The wireless LAN module 131 may connect to the Internet via a wireless Access Point (AP) (not shown), under a control of the controller 110. The wireless LAN module 131 supports a wireless LAN standard (IEEE802.11x) of the Institute of Electrical and Electronics Engineers (IEEE).

The short range communication module 132 may perform short range communication wirelessly between the portable terminal 100 and an image forming apparatus (not illustrated) according to the control of the control unit 110. For example, a short-range communication scheme may include a Bluetooth communication scheme, an Infrared Data Association (IrDA) communication scheme, a WiFi-Direct communication scheme, a Near Field Communication (NFC) scheme, etc.

In FIG. 1, the portable terminal 100 includes the mobile communication module 120, the wireless LAN module 131, and the short range communication module 132. However, according to desired performance, the portable terminal 100 may include a combination of the mobile communication module 120, the wireless LAN module 131, and the short range communication module 132. Herein, at least one or a combination of the mobile communication module 120, the wireless LAN module 131, and the short range communication module 132 are referred to as "a transceiver," without limiting the scope of the present disclosure.

The multimedia module 140 includes the broadcasting communication module 141, the audio reproduction module 142, and the video reproduction module 143. The broadcasting communication module 141 receives a broadcasting signal (e.g., a TV broadcasting signal, a radio broadcasting signal or a data broadcasting signal) or additional broadcasting information (e.g., Electric Program Guide (EPS) or Electric Service Guide (ESG)), which are transmitted from a broadcasting station, through a broadcasting communication antenna (not illustrated), under the control of the controller 110.

The audio reproduction module 142 may reproduce a stored or received digital audio file (for example, a file having a file extension of mp3, wma, ogg, or wav) under a control of the controller 110.

The video reproduction module 143 may reproduce a stored or received digital video file (for example, a file of which the file extension is mpeg, mpg, mp4, avi, mov, or mkv) under the control of the controller 110.

The video reproduction module 143 may reproduce a digital audio file.

Alternatively, the multimedia module 140 may include different combinations of the broadcasting communication module 141, the audio reproduction module 142, and the video reproduction module 143. For example, the multimedia module 140 may include the audio reproduction module 142 and the video reproduction module 143, but not the broadcasting communication module 141. Further, the audio reproduction module 142 or the video reproduction module 143 of the multimedia module 140 may be included in the controller 110.

The camera module 150 includes the first camera 151 and the second camera 152, which photograph still images or video under control of the controller 110. Further, the camera module 150 includes the barrel 155 performing a zoom-in/out for photographing a subject, the motor 154 controlling a movement of the barrel 155, and a flash 153 providing an auxiliary light source required for photographing the subject. Alternatively, the camera module 150 may include different combinations of the first camera 151, the second camera 152, the barrel 155, the motor 154, and the flash 153.

The first camera 151 may be disposed on a front surface of the portable terminal 100, and the second camera 152 may be disposed on a rear surface of the portable terminal 100. Alternatively, the first camera 151 and the second camera 152 may be disposed to be adjacent to each other (e.g., an interval between the first camera 151 and the second camera 152 is larger than 1 cm and smaller than 8 cm) to photograph a three-dimensional still image or a three-dimensional dynamic image.

Each of the first and second cameras 151 and 152 includes a lens system, an image sensor and the like. The first and second cameras 151 and 152 convert optical signals input (or taken) through the lens system into electric image signals, and output the electric image signals to the controller 110. A user photographs a dynamic image or a still image through the first and second cameras 151 and 152.

The GPS module 157 receives radio waves from a plurality of GPS satellites (not illustrated) in Earth's orbit and calculate a position of the portable terminal 100 by using Time of Arrival information from the GPS satellites to the portable terminal 100.

The input/output module 160 includes a button 161, the microphone 162, the speaker 163, the vibration motor 164, the connector 165, the keypad 166, the earphone connecting jack 167, and the input unit 168. The input/output module is not limited thereto, and a mouse, a trackball, a joystick, or a cursor control such as cursor direction keys may be provided to control a movement of the cursor on the screen 190. Alternatively, the input/output module 160 may include different combinations of the button 161, the microphone 162, the speaker 163, the vibration motor 164, the connector 165, the keypad 166, the earphone connecting jack 167, and the input unit 168.

The button 161 (or multiple buttons) may be formed on the front surface, side surfaces or the rear surface of the housing of the portable terminal 100 and may include at least one of a power/lock button (not illustrated), a volume button (not illustrated), a menu button, a home button, a back button, and a search button 161.

The microphone 162 receives a voice or a sound to generate an electrical signal under the control of the controller 110.

The speaker 163 outputs sounds corresponding to various signals of the mobile communication module 120, the sub-communication module 130, the multimedia module 140, and the camera module 150 (for example, a radio signal, a broadcast signal, a digital audio file, a digital video file, or photographing) to the outside of the portable terminal 100 under the control of the controller 110. The speaker 163 may output a sound (for example, button tone corresponding to phone communication, ringing tone, and a voice of another user) corresponding to a function performed by the portable terminal 100. One or more speakers 163 may be formed on a suitable position or positions of the housing of the portable terminal 100.

The vibration motor 164 converts an electric signal into a mechanical vibration under a control of the controller 110. For example, when the portable terminal 100 in a vibration mode receives a voice call from any other device (not illustrated), the vibration motor 164 operates. One or more vibration motors 164 may be provided in the housing of the portable terminal 100. The vibration motor 164 may operate in response to a touch action of the user on the screen 190 and successive motions of touches on the screen 190.

The connector 165 may be used as an interface for connecting the portable terminal 100 with an external device (not shown) or a power source (not shown). The portable terminal 100 may transmit or receive data stored in the storage unit 175 of the portable terminal 100 to or from an external device (not shown) through a wired cable connected to the connector 165 according to a control of the controller 110. Further, the portable terminal 100 may receive power from the power source through the wired cable connected to the connector 165 or charge a battery (not shown) by using the power source.

The keypad 166 may receive a key input from a user for control of the portable terminal 100. The keypad 166 includes a physical keypad (not shown) formed in the portable terminal 100 or a virtual keypad (not shown) displayed on the display unit 190. The physical keypad (not illustrated) formed on the portable terminal 100 may be omitted according to the capability or configuration of the portable terminal 100.

Earphones (not shown) may be inserted into the earphone connecting jack 167 according to an embodiment to be connected to the portable terminal 100, and the input unit 168 may be inserted into and preserved in the portable terminal 100 and may be extracted or detached from the portable terminal 100 when being used.

In addition, an attachment/detachment recognition switch 169 operating in response to attachment or detachment of the input unit 168 is provided at one area within the portable terminal 100 into which the input unit 168 is inserted, and provides a signal corresponding to the attachment or detachment of the input unit 168 to the controller 110. The attachment/detachment recognition switch 169 is located at one area into which the input unit 168 is inserted to directly or indirectly contact the input unit 168 when the input unit 168 is mounted. Accordingly, the attachment/detachment recognition switch 169 generates a signal corresponding to the attachment or the detachment of the input unit 168 based on the direct or indirect contact with the input unit 168 and then provides the generated signal to the controller 110.

The sensor module 170 includes at least one sensor for detecting a state of the portable terminal 100. For example, the sensor module 170 may include a proximity sensor that detects a user's proximity to the portable terminal 100, an illumination sensor (not illustrated) that detects a quantity of light around the portable terminal 100, a motion sensor (not illustrated) that detects a motion (e.g., rotation of the portable terminal 100 and acceleration or a vibration applied to the portable terminal 100) of the portable terminal 100, a geo-magnetic sensor (not illustrated) that detects a point of a compass by using Earth's magnetic field, a gravity sensor that detects an action direction of gravity, and an altimeter that detects an altitude through measuring an atmospheric pressure. At least one sensor may detect the state, and may generate a signal corresponding to the detection to transmit the generated signal to the controller 110. The sensor of the sensor module 170 may be added or omitted according to a capability of the portable terminal 100.

The storage unit 175 store signals or data input/output in response to the operations of the mobile communication module 120, the sub-communication module 130, the multimedia module 140, the camera module 150, the GPS module 157, the input/output module 160, the sensor module 170, and the screen 190 according to the control of the controller 110. The storage unit 175 can store a control program and applications for controlling the portable terminal 100 or the controller 110.

The term "storage unit" includes the storage unit 175, the ROM 112 and the RAM 113 within the controller 110, or a memory card (not shown) (for example, an SD card or a memory stick) installed in the portable terminal 100. Further, the storage unit may include a nonvolatile memory, a volatile memory, a Hard Disk Drive (HDD), or a Solid State Drive (SSD).

The storage unit 175 may store applications having various functions such as a navigation function, a video call function, a game function, and a time based alarm function, images for providing a Graphical User Interface (GUI) related to the applications, databases or data related to a method of processing user information, a document, and a touch input, background images (a menu screen, an idle screen or the like) or operating programs required for driving the portable terminal 100, and images photographed by the camera module 150. The storage unit 175 is a machine (for example, computer)-readable medium. The term "machine-readable medium" may be defined as a medium capable of providing data to the machine so that the machine performs a specific function. The machine-readable medium may be a storage medium. The storage unit 175 may include a non-volatile medium and a volatile medium. All of these media should be a type that allows the commands transferred by the media to be detected by a physical instrument in which the machine reads the commands into the physical instrument.

The machine-readable medium includes at least one of a floppy disk, a flexible disk, a hard disk, a magnetic tape, a Compact Disc Read-Only Memory (CD-ROM), an optical disk, a punch card, a paper tape, a Random Access Memory (RAM), a Programmable Read-Only Memory (PROM), an Erasable PROM (EPROM), and a flash-EPROM, but is not limited thereto.

The power supplier 180 supplies power to one or more batteries (not illustrated) disposed in the housing of the portable terminal 100 under the control of the controller 110. The one or more batteries (not illustrated) supply power to the portable terminal 100. In addition, the power supplier 180 may supply, to the portable terminal 100, the power input from an external power source (not illustrated) through a wired cable connected with the connector 165. The power supplier 180 may supply power wirelessly input from the external power source through a wireless charging technology to the portable terminal 100.

As described above, the portable terminal 100 includes a screen 190 providing user interfaces corresponding to various services (for example, a phone call, data transmission, broadcasting, and photography) to the user. Alternatively, the portable terminal 100 may include multiple screens 190. Each of the screens 190 may transmit an analog signal corresponding to at least one touch input to a user interface to a corresponding screen controller.

As described above, the portable terminal 100 may include a plurality of screens 190, and each of the screens 190 may include a screen controller 195 that receives an analog signal corresponding to a touch. The screens may be connected to a plurality of housings through a hinge, respectively, or may be located in a single housing without a hinge connection.

The screen 190 may detect at least one of the touch and the hovering through a touch device (for example, a stylus pen, an electronic pen, a finger, etc.).

Accordingly, the screen 190 includes a touch panel 191 that can detect a touch input using an input device and a hovering panel 192 that can detect a hovering input using an input device. The hovering panel 912 may include a panel in an EMR type which can detect a distance between the input unit or the finger and the screen 190 through a magnetic field. The screen 190 may receive successive motions of the touch or the hovering using the input unit or the finger and include a display panel (not shown) that can display a trace formed by the successive motions. The panel in the EMR type may be configured below the display panel and may detect the hovering.

The display panel (not shown) may be a panel such as an LCD, an AMOLED or the like and may display various images and a plurality of objects according to various operation statuses of the portable terminal 100, an execution of an application and a service. Further, the display panel (not shown) may include a layer for controlling an output of an object.

The screen 190 may separately include panels (for example, touch panel 191 and hovering panel 192) that can detect the touch and the hovering using the finger or the input unit, respectively, or may detect the touch and the hovering through only one panel. Values detected by the respective panels may be different and may be provided to the screen controller. Further, the screen controller may differently recognize the values of the touch and the hovering input from the respective panels to determine whether the input from the screen 190 is an input by a user's body or an input by a touchable input unit. The screen 190 may display one or more objects on the display panel. The object may include a trace formed by a movement of the finger or the input unit as well as a picture, a video, and a document. Further, the screen 190 or the display panel may include a layer for controlling a display of an object. The layer may be a virtual layer implemented by software.

When the touch or hovering input is detected, the screen 190 may determine a distance between the detected position and the finger or the input unit having provided the input. An interval which can be detected by the screen 190 may be changed according to a capability or a structure of the portable terminal 100. Particularly, the screen 190 is configured to distinguish the touch by the contact with the user's body or the touch input unit and the input in a proximity state (for example, hovering) and configured to output different values (for example, including voltage values or current values as analog values) detected by the touch and the hovering. Further, it is preferable that the screen 190 outputs a different detected value (for example, a current value or the like) according to a distance between a position in the air where the hovering is generated and the screen 190.

The screen 190 may be implemented as, for example, a resistive type, a capacitive type, an infrared type, or an acoustic wave type.

The screen 190 includes a plurality of pixels and displays an image through the pixels. The screen 190 may use an LCD, an OLED, or an LED.

Further, the screen 190 includes a plurality of sensors detecting, when the input unit 168 touches a surface of the screen 190 or is placed within a predetermined distance from the screen 190, a position of the input unit 168. The plurality of sensors may be formed with a coil structure, and in a sensor layer formed of the plurality of sensors, the sensors are arranged in a predetermined pattern and form a plurality of electrode lines. When the touch or the hovering is generated on the screen 190 through input unit 168, a detection signal of which a waveform is changed due to a magnetic field between the sensor layer and the input unit is generated by such a structure, and the screen 190 transmits the generated detection signal to the controller 110.

Further, when the contact on the screen 190 occurs through the finger, the screen 190 transmits, to the controller 110, a detection signal caused by capacitance.

A predetermined distance between the input unit 168 and the screen 190 may be detected through an intensity of a magnetic field generated by a coil 430.

The screen 190 may detect the input using the input device 168 and display a screen in which an output of an object is controlled in a partial area of the screen 190 according to the detected input under a control of the controller 110. The object may be output after a brightness or a color of the object is controlled or a transparency effect is applied to the object. The input may include at least one of the touch and the hovering. The screen 190 may display an object output in the partial area differently from an object output in other areas. Further, the screen 190 may display such that a trace of input writing sequentially disappears in response to an input of writing using a touch or hovering. When a touch or hovering using the input device 168 is generated on the disappearing trace, the screen 190 may translucently or opaquely displays the disappearing trace.

As described above, the translucently or opaquely displayed trace may be included in an area formed based on the touch position by the input device 1668 or a position having a proximity distance (or shortest distance) from the input unit. Further, the screen 190 may more brightly display the partial area than other areas in response the input of writing using the touch or hovering. Other areas may also be displayed translucently or opaquely.

As described above, the screen may apply a gradation effect between the partial area and other areas. Further, the screen 190 may display such that at least one of a size, an object output, and a color of the partial area is different from that in other areas in response to the detection of the touch or hovering using the input unit or finger in a state where a predetermined object is displayed. At least one of the size of the partial area and an object output of the remaining areas may be controlled in accordance with a touch between the input device 168 and the screen 190 or a distance of the hovering.

The screen controller 195 converts the analog signal received from the screen 190 to a digital signal (for example, X and Y coordinates) and then transmits the digital signal to the controller 110. The controller 110 can control the screen 190 by using the digital signal received from the screen controller 195. For example, the controller 110 allows a short-cut icon (not shown) or an object displayed on the screen 190 to be selected or executed in response to a touch or hovering. Further, the screen controller 195 may be included in the controller 110.

Moreover, the screen controller 195 may identify a distance between a position in the air where the hovering is generated and the screen 190 by detecting a value (for example, a current value or the like) output through the screen 190, convert the identified distance value to a digital signal (for example, a Z coordinate), and then provide the converted digital signal to the controller 110.

Figure 2:
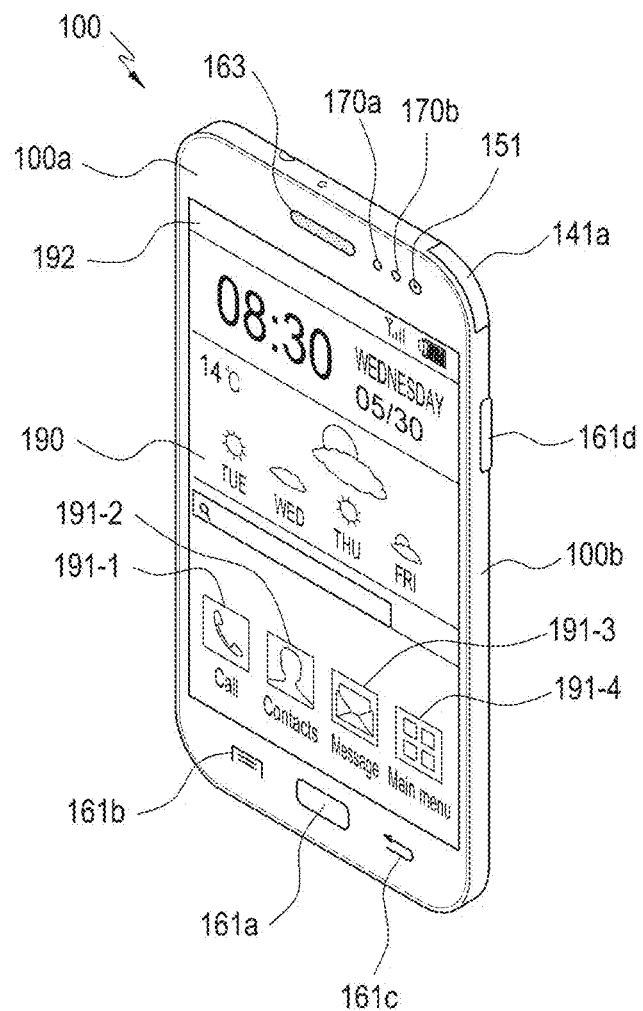
FIG. 2 is a front perspective view illustrating a portable device according to an embodiment of the present invention.
Figure 3:
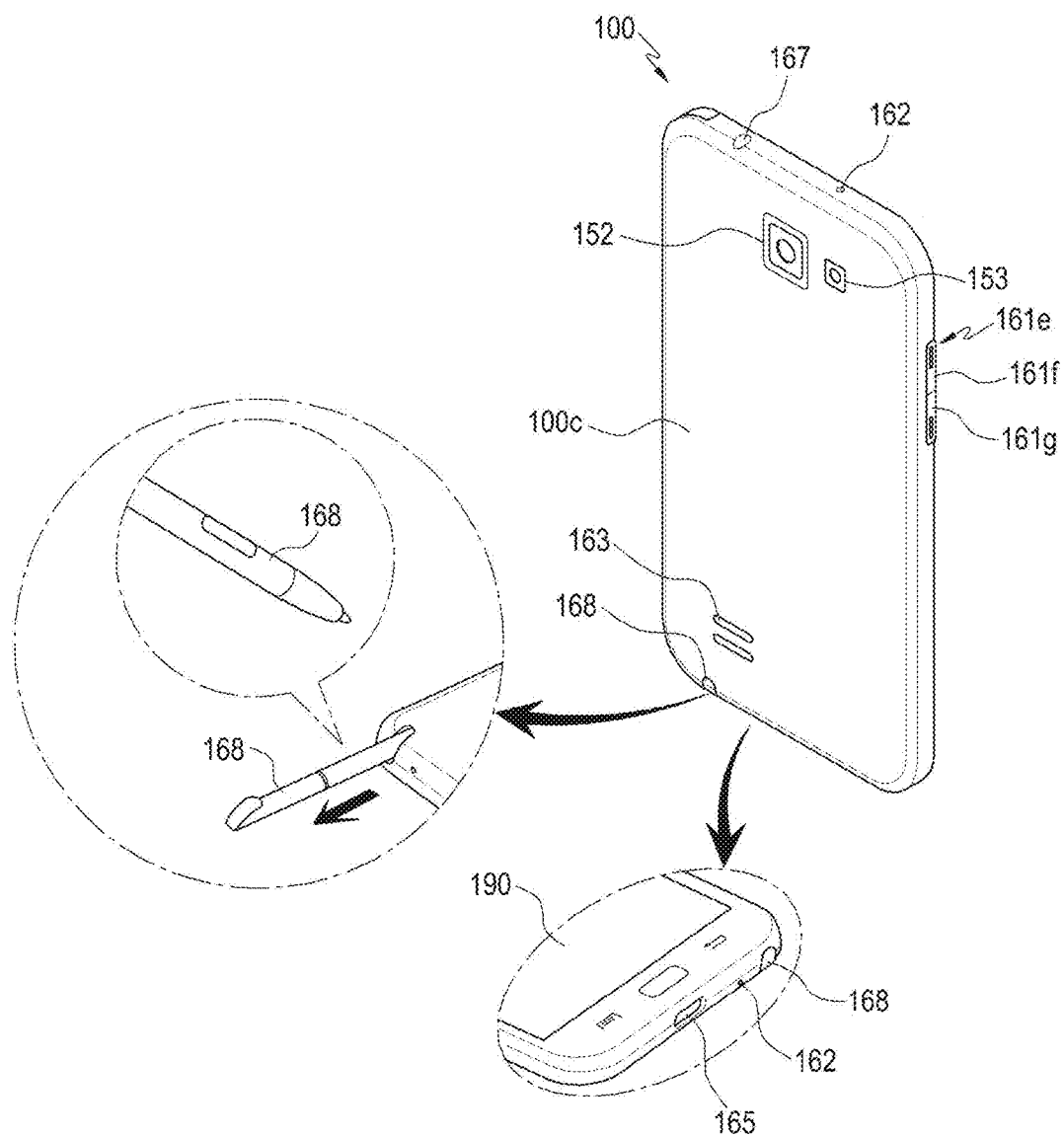
FIG. 3 is a rear perspective view illustrating a portable device according to an embodiment of the present invention.

FIG. 2 is a front perspective view of a portable terminal according to an embodiment of the present invention, and FIG. 3 is a rear perspective view of a portable terminal according to an embodiment of the present invention.

Referring to FIGS. 2 and 3, the screen 190 is disposed in a center of a front surface 100a of the portable terminal 100. The screen 190 may have a large size that occupies most of the front surface 100a of the portable terminal 100.

FIG. 2 illustrates an example where a main home screen is displayed on the screen 190. The main home screen is a first screen displayed on the screen 190 when power of the portable terminal 100 is turned on. Further, when the portable terminal 100 has different home screens of several pages, the main home screen may be a first home screen of the home screens of several pages. Short-cut icons 191-1, 191-2, and 191-3 for executing frequently used applications, a main menu switching key 191-4, time, weather, etc., are displayed on the home screen. The main menu switch key 191-4 displays a menu screen on the screen 190.

A status bar 192 indicating a status of the portable terminal 100 such as a battery charge status, an intensity of a received signal and a current time is formed at a top end of the screen 190.

A home button 161a, a menu button 161b, and a back button 161c are formed at a lower portion of the screen 190.

The home button 161a displays the main home screen on the screen 190. For example, when the home key 161a is touched while a home screen different from the main home screen or the menu screen is displayed on the screen 190, the main home screen is displayed on the screen 190. Further, when the home button 191a is touched while applications are executed on the screen 190, the main home screen illustrated in FIG. 2 is displayed on the screen 190. Further, the home button 161a may be used to display recently used applications or a task manager on the screen 190.

The menu button 161b provides a connection menu that may be used on the screen 190. The connection menu may include a widget addition menu, a background change menu, a search menu, an editing menu, an environment setup menu, etc.

The back button 161c may be used for displaying the screen which was executed just before the currently executed screen or terminating the most recently used application.

The first camera 151, an illumination sensor 170a, and a proximity sensor 170b are disposed on edges of the front side 100a of the portable terminal 100. The second camera 152, the flash 153, and the speaker 163 are disposed on a rear surface 100c of the portable terminal 100.

For example, a power/reset button 160a, a volume button 161b, a terrestrial DMB antenna 141a for receiving a broadcast, and one or more microphones 162 are disposed on a side surface 100b of the portable terminal 100. The DMB antenna 141a may be fixed to the portable terminal 100 or may be formed to be detachable from the portable terminal 100.

Further, the portable terminal 100 has the connector 165 arranged on a lower side surface.

A plurality of electrodes are formed in the connector 165, and the connector 165 may be connected to an external device through a wire.

The earphone connecting jack 167 is formed on an upper side surface of the portable terminal 100. Earphones may be inserted into the earphone connecting jack 167.

The input unit 168, such as a stylus, may be received in a lower side surface of the portable terminal 100. For example, the input unit 168 may be inserted into the portable terminal 100 to be stored in the portable terminal 100, and withdrawn and detached from the portable terminal 100 when being used.

Figure 4A:
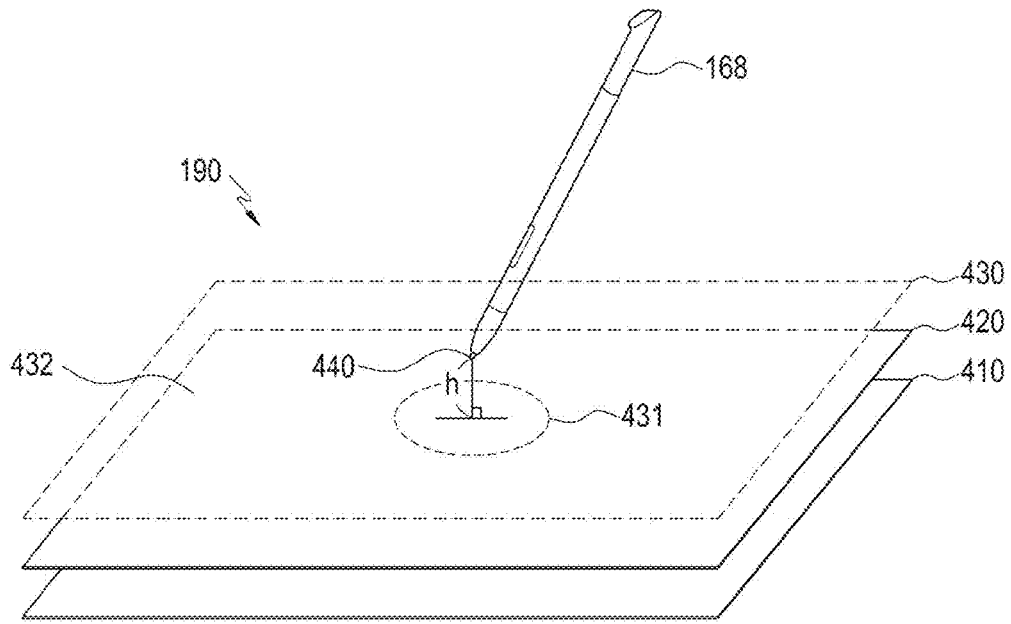
FIG. 4A illustrates an example separately including a layer for controlling a display of an object according to an embodiment of the present invention.
Figure 4B:
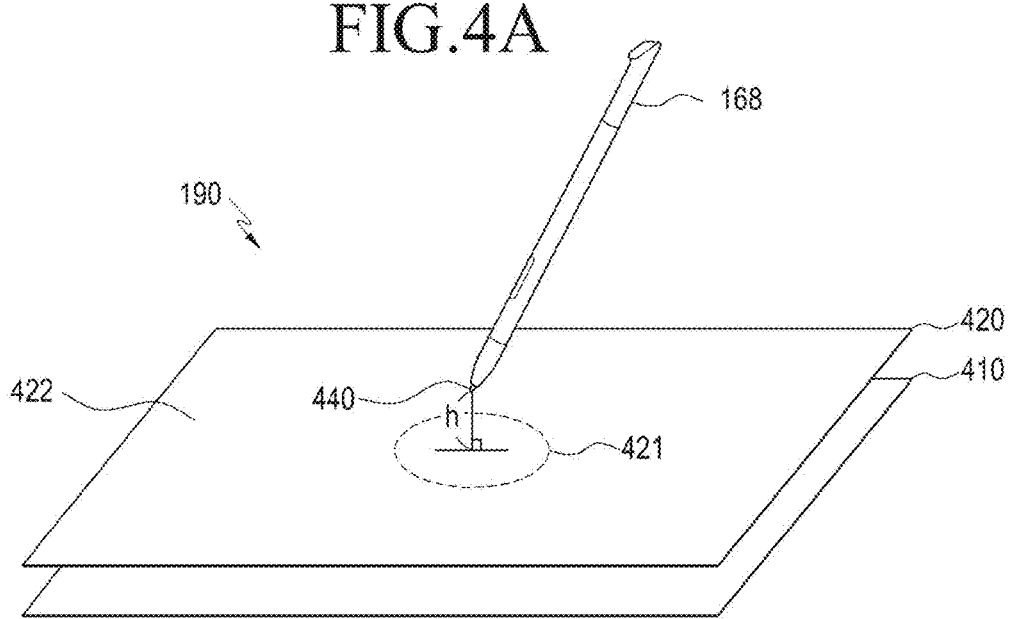
FIG. 4B illustrates an example which does not separately include a layer for controlling a display of an object according to an embodiment of the present invention.

FIGS. 4A and 4B illustrate a configuration of a plurality of layers for controlling a display of an object according to an embodiment of the present disclosure. Specifically, FIG. 4A illustrates an example separately including a layer for controlling a display of an object according to an embodiment of the present invention, and FIG. 4B illustrates an example which does not separately include a layer for controlling a display of an object according to an embodiment of the present invention.

The application according to an embodiment of the present invention can be applied to various applications for displaying objects, such as a picture, and various applications in which the writing input can be made, such as a drawing, a text input, a diary, etc. The application may include one or more layers according to a function or attribute thereof. For example, if the application is an application for displaying or writing objects, such as a writing input, a drawing, a text input or certain pictures, the application may include various menus such as a menu that receives a selection from the user to display the objects, a menu that configures an environment of the application, and a menu that displays the objects. The application of the present invention may include a plurality of layers for displaying the objects, and each of the plurality of layers is allocated to each menu.

Referring to FIGS. 4A and 4B, when an application displaying an object on the screen 190 is executed, a first layer 410 of the application may be located at the bottom, a second layer 420 may be located on the first layer 410, and a third layer 430 may be located on the second layer 420. The first layer 410 is not directly shown to the user but serves as a container that contains other layers, and may be called a layout. The layout may include a frame layout, a relative layout, and a linear layout. The second layer 420 may display an object such as a picture, writing, or a document. The third layer 430 controls at least a part of the display of the object displayed on the second layer 420 and may be opaque or translucent. An area for displaying an object in response to a touch or hover input may be formed on the third layer 430. The area may be formed with a predetermined radius from a position of the touch or hover input. A described above, when the input is the hovering, a size of the area may be variably controlled according to a distance between a position where the hovering is detected (in the air) and the screen. Further, a position of the area may be changed in accordance with a movement of the input.

The controller 110 may control an attribute of the third layer 430 such that a part of the object corresponding to the formed area is displayed differently from other parts of the object. The attribute may include at least one of a size of the area, a brightness of the area, a gradation effect of the area, and a color of the object corresponding to the area. Further, as illustrated in FIG. 4B, even when the third layer 430 is not included, the controller may control the display of the object by controlling an attribute of the second layer 420.

Figure 5:
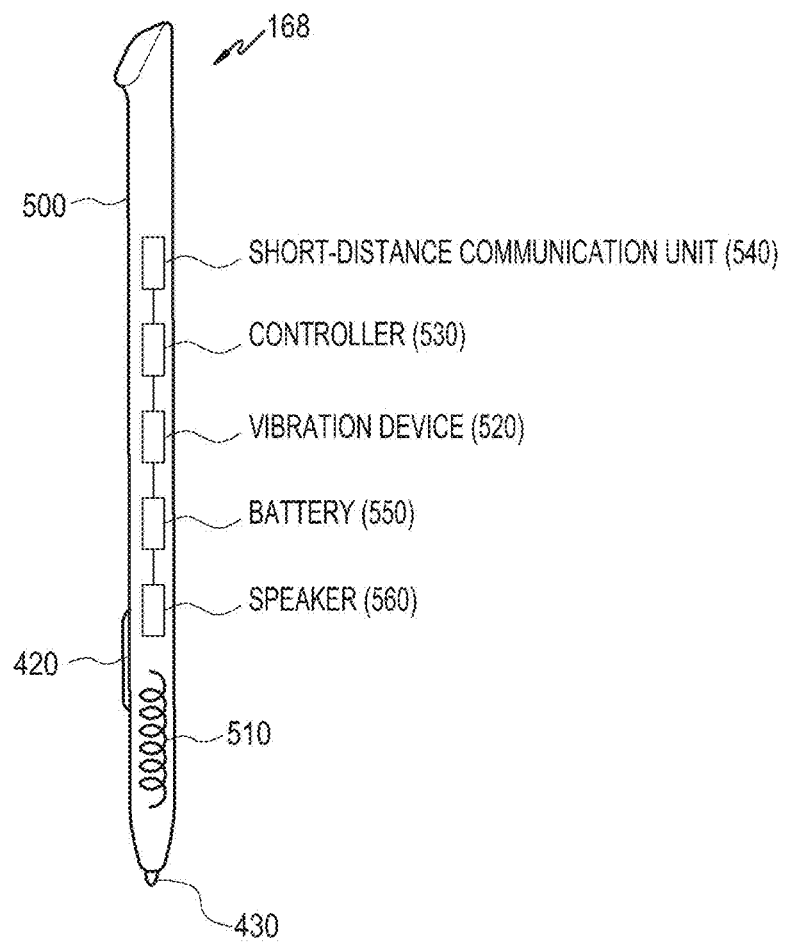
FIG. 5 illustrates an input device according to an embodiment of the present invention.

FIG. 5 is a block diagram illustrating an input device according to an embodiment of the present invention.

Referring to FIG. 5, the input device 168 (for example, a touch pen) includes a penholder 500, a nib 430 disposed at an end of the penholder, a button 420 that may change an electromagnetic induction value generated by a coil 510 included inside the penholder, e.g., adjacent to the nib 430. The input device 168 also includes a vibration device 520, a controller 530 that generally controls the input unit 168, a short-range communication unit 540 that performs short-range communication with the portable terminal 100, and a battery 550 that supplies power to the input unit 168.

The input unit 168 illustrated in FIG. 5 supports the EMR type. Accordingly, when a magnetic field is form on a predetermined position of the screen 190 by the coil 510, the screen 190 may recognize a touch position through detecting a location of the corresponding magnetic field.

Figure 6:
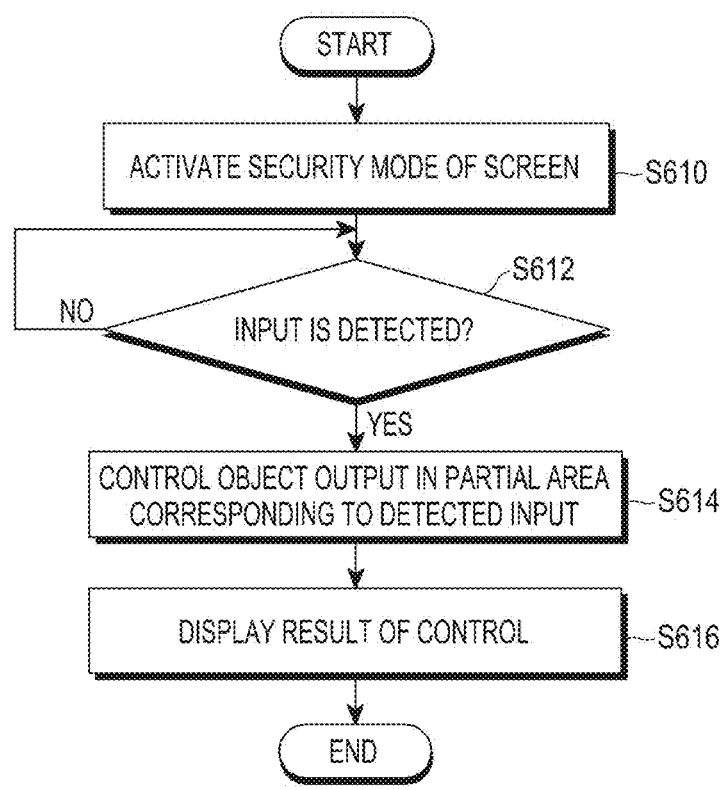
FIG. 6 is a flowchart illustrating a method of controlling a screen of a portable terminal according to an embodiment of the present invention.

FIG. 6 is a flowchart illustrating a method of controlling a screen of a portable terminal according to an embodiment of the present invention.

Referring to FIG. 6, the portable terminal activates a security mode of the screen in step S610. The security mode controls an object output (or display) of the screen, such that the user can view the screen, but other people adjacent to the user cannot easily view the screen. As described above, in accordance with an embodiment of the present invention, the object output may be controlled in a partial area by activating the security mode or the object output may be controlled in a partial area in response to detecting a hovering or touch input, without the activation of the security mode.

In order to control the object output of the screen using the security mode, the portable terminal may automatically activate the security mode by analyzing an ambient situation of the portable terminal or manually activate the security mode in response to a user input or setting. Further, the security mode may configure at least one of a size and an object output of an area through which the object is displayed on the screen, and a time for a trace input is displayed before being sequentially transitioned to be transparent, or translucent.

As indicated above, the security mode may be automatically activated through an analysis of an ambient situation of the portable terminal or may be activated when a condition configured by the user is applied. The ambient situation and the condition include at least one of a current position of the portable terminal, a time, an ambient situation, ambient brightness, and ambient noise. Further, the ambient situation and the condition can be controlled or configured by the user. Basically, the security mode may be executed by the user or may be automatically executed based on at least one of a current position of the portable terminal, a time, an ambient situation, ambient brightness, and ambient noise.

When an input on the screen is detected in step S612, the portable terminal controls the object output in a partial area corresponding to the detected input in step S614. The controller 220 may detect an input of at least one of a touch, a gesture, and/or a hovering on the screen by the input device. The controller 110 may control the display such that the object output in the partial area is displayed differently from object outputs in other areas.

Further, the controller 110 may control the screen so that the object output or an object color in the partial area of the screen is displayed differently from that in the remaining areas except for the partial area.

Further, the object in the partial area may be output more brightly than objects in other areas and the other areas may be the remaining areas except for the partial area.

As described above, for a hovering input, the size of the partial area and/or the object output may be controlled in accordance with a distance between the detection of the hover input and the screen, and the partial area may be formed based on a position having a proximity (or shortest) distance from the position at which the hovering is detected.

Again, the controller 110 may control the display such that a trace of writing made using a touch or hover input sequentially disappears.

Further, the controller 110 may control the object output such that the disappeared trace is translucently redisplayed in response to the generation of the hovering using the input device on the disappearing trace. The translucently displayed trace may be included in the area formed based on the touched position by the input device or the position having the proximity (shortest) distance from the position where the hovering is detected.

Further, the controller 110 may control the object in the partial area to be brighter than objects in other areas in response to the input of the writing using the touch or hovering on the screen. The other areas may be translucently or opaquely displayed.

The portable terminal displays a result of the control in step S616. For example, the screen may display the object output in the partial area differently from object outputs in other areas, under a control of the controller 110.

Figure 7:
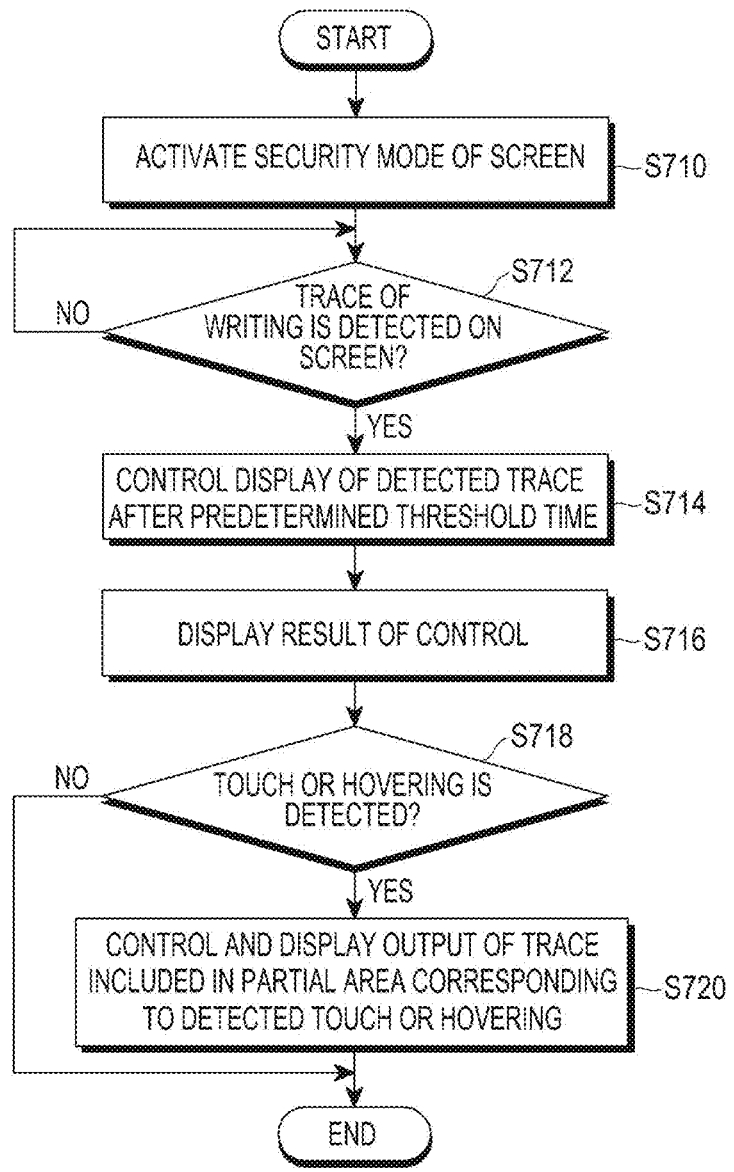
FIG. 7 is a flowchart illustrating a method of controlling a display of a trace by a touch or a hovering on a screen of a portable terminal according to an embodiment of the present invention.

FIG. 7 is a flowchart illustrating a trace display controlling method b on a screen of a portable terminal according to an embodiment of the present invention.

FIGS. 8A to 8D illustrate examples of controlling a display of a trace input on the screen of the portable terminal according to an embodiment of the present invention. Specifically, FIG. 8A illustrates an example of inputting a trace on the screen of the portable terminal according to an embodiment of the present invention, FIG. 8B illustrates an example of controlling to make a trace input on the screen of the portable terminal sequentially disappear, after a predetermined time, according to an embodiment of the present invention, FIG. 8C illustrates another example of controlling to make a trace input on the screen of the portable terminal sequentially disappear, after a predetermined time, according to an embodiment of the present invention, and FIG. 8D illustrates an example of controlling a display of the disappearing trace in accordance with a touch or hovering input on the trace input on the screen of the portable terminal according to an embodiment of the present invention.

Referring to FIG. 7, the portable terminal activates a security mode of the screen in step S710. As described above, the controller 110 may analyze an ambient situation of the portable terminal to control an object output on the screen, or configure and/or activate the security mode in response to an input by a user.

When a trace on the screen by writing is detected in step S712, the portable display controls a display of the detected trace after a predetermined threshold time in step S714, and displays a result of the control in step S716. More specifically, a writing input is detected, and the controller 110 displays a trace of the input writing on the screen. Thereafter, the displayed trace is sequentially output as a transparent or translucent trace, after a predetermined time, according to a configuration of the security mode. The predetermined time may be configured by the user or may be variably controlled by at least one of a current position of the portable terminal, a time, an ambient situation, ambient brightness, and ambient noise. The term "sequentially" corresponds to a time when the trace is input.

Referring to FIG. 8A, when a trace 811 is written using a touch or a hovering input of an input device 850 into a memo pad displayed on the screen 810, the controller 110 displays the trace. After a predetermined time elapses from a first portion of the trace being input, the trace is sequentially displayed as transparent or translucent. For example, the trace 811 is displayed such that an object output gradually disappears (that is, becomes transparent) according to an input time order of the traces, a first trace 811*a*, a second trace 811*b*, and a third trace 811*c*.

Although object outputs of the first trace to the third trace in FIG. 8A are shown as different segments, this is only for an easy description and the traces may be displayed with gradation. Further, although FIGS. 8A to 8D illustrate that the trace by writing is input into the memo pad, it is only an embodiment and the present disclosure can be applied to various applications in which the writing input can be made, such as a drawing, a text input, a diary, etc.

Referring to FIG. 8B, a trace of writing using the input device 850 is input into the screen 820, and after a predetermined time elapses, the trace sequentially disappears (for example, trace is transparently displayed) from the screen, like a pre-input trace 821. Further, a trace 822, which is input after the trace 821, is less transparent than the trace 821, and an object output of the trace 822 may be also controlled according to an input time. That is, an object output of the trace 822 may gradually disappear (that is, become transparent) according to an input time sequence, like a trace 822*a* and a trace 822*b*. Although object outputs of the trace 822*a* and the trace 822*b* in FIG. 8B are illustrated as separate segments, it is only for an easy description, and the traces according to the present invention may be displayed with gradation, which is sequentially applied according to an input time. As described above, the time by which the traces sequentially disappear may be configured by the user in the security mode or may be automatically configured by at least one of a current position of the portable terminal, a time, an ambient situation, ambient brightness, and ambient noise.

Referring to FIG. 8C, a trace is input into the screen 830, and after a predetermined time elapses, the input trace becomes sequentially translucent, like a trace 831. The trace 831 may be displayed to sequentially disappear as the time elapses. For example, the trace 832 may gradually disappear (that is, become transparent) according to an input time sequence, like a trace 832*a* and a trace 832*b*. Again, although object outputs of the trace 832*a* and the trace 832*b* in FIG. 8C are illustrated as separate segments, this is only for an easy description, and the traces according to the present invention may be displayed with gradation sequentially applied according to an input time. As described above, the time by which the traces sequentially become translucent may be configured by the user in the security mode or may be automatically configured by at least one of a current position of the portable terminal, a time, an ambient situation, ambient brightness, and ambient noise.

As described above, the screen may display the input traces to be sequentially transparent or translucent after a predetermined time, under a control of the controller.

Referring again to FIG. 7, when a touch or hovering input is detected in step S718, the portable terminal displays a trace included in a partial area corresponding to the detected touch or hovering, while controlling an output of the trace in step S720. For example, when a hovering between the input device and the screen is detected, the controller 110 controls the screen so that the disappeared trace is translucently or opaquely re-displayed. The translucently or opaquely trace may be a trace included in a partial area formed based on a touched position by the input device or a position having a proximity (or shortest) distance between the device and the screen. A size of the partial area may be configured in the security mode or controlled by the user.

Referring to FIG. 8D, the screen 840 displays traces of area 841 and traces of area 842 of writings sequentially input. After a predetermined time elapses, the controller 110 controls the screen such that the input traces sequentially disappear. Thereafter, when a touch or hovering input is detected on the disappeared trace of the area 841, the controller 110 translucently or opaquely re-displays the trace in a partial area 840, in response to the detection of the touch or the hovering. The translucently or opaquely displayed trace in the partial area 840 may be re-displayed such that the trace gradually disappears while moving away from a touched position of the input or a position having a proximity (or shortest) distance from a position where a hovering is detected.

As described above, size of the partial area 841 may be controlled according to a distance between the input device 850 and the screen 840 or controlled according to a configuration of the security mode.

The trace of the area 842 made after the trace of the partial area 841 may be displayed differently from the trace of the partial area 841 according to an input time. For example, the trace of the area 842 may gradually disappear (that is, become transparent) according to an input time sequence, like a trace 842*a* and a trace 842*b*.

The trace input by the touch or the hovering is displayed in the other area 842 and the trace within the area 842 is transparent or opaque.

Figure 9:
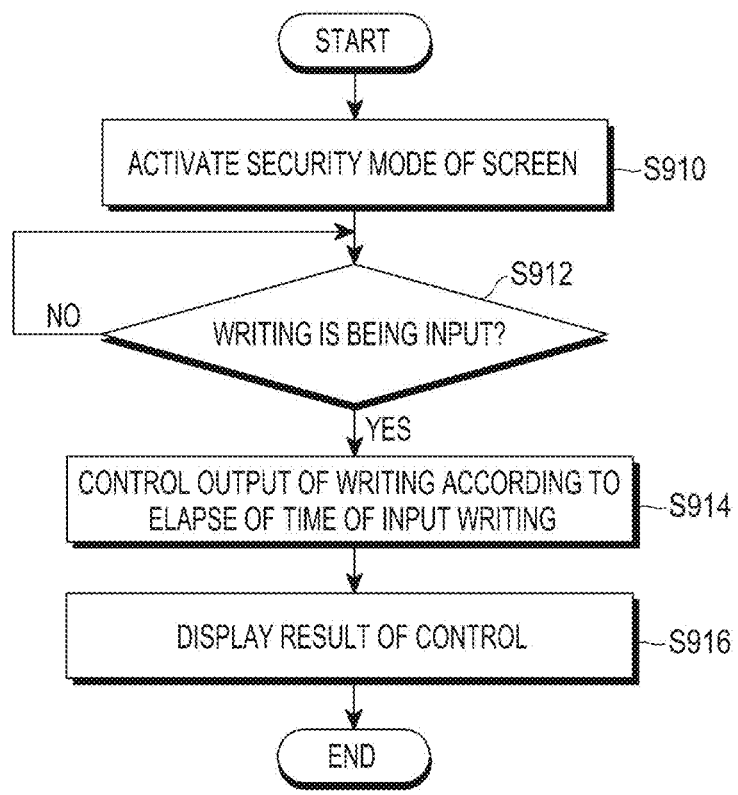
FIG. 9 is a flowchart illustrating a method of controlling an object output on a screen, based on a position at which writing is input into the screen of a portable terminal, according to an embodiment of the present invention.

FIG. 9 is a flowchart illustrating a method of controlling an object output of a screen, based on a position at which writing is input into the screen of the portable terminal, according to an embodiment of the present invention.

Figure 10A:
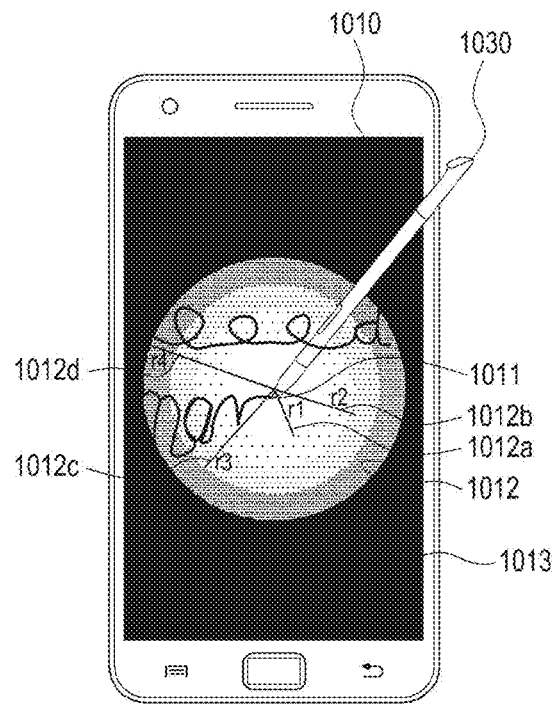
FIG. 10A illustrates an example of controlling an object output in a partial area formed, based on a position at which writing is input into a screen, according to an embodiment of the present invention.
Figure 10B:
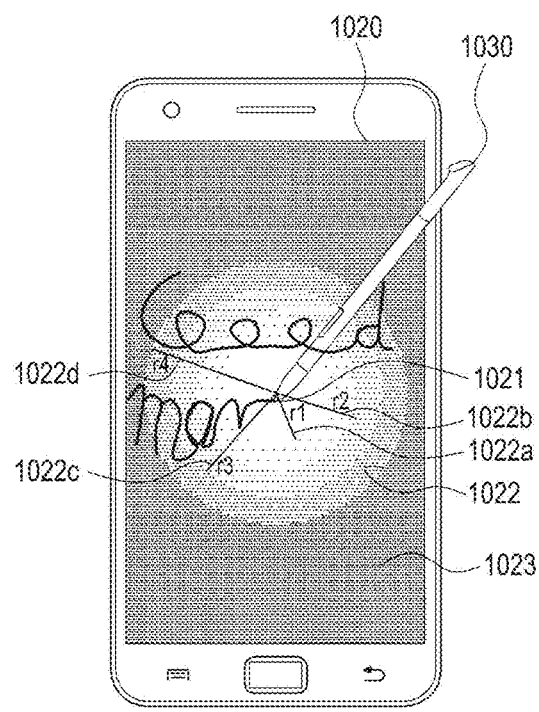
FIG. 10B illustrates another example of controlling an object output in a partial area formed, based on a position at which writing is input into a screen, according to an embodiment of the present invention.

FIGS. 10A and 10B illustrate an example of a process of controlling an object output of the screen, based on a position at which writing is input into the screen of the portable terminal, according to an embodiment of the present invention. Specifically, FIG. 10A illustrates an example of controlling an object output in a partial area that is formed, based on a position at which writing is input into the screen, according to an embodiment of the present invention, and FIG. 10B illustrates another example of controlling an object output in a partial area that is formed, based on a position at which writing is input into the screen, according to an embodiment of the present invention.

Referring to FIG. 9, the portable terminal activates a security mode of the screen in step S910. The operation of step S910 is the same as described in steps S610 and S710, as described above. Accordingly, a repetitive description of step S910 will not be provided.

When writing is being input in step S912, the controller 110 controls an output of the writing according to the elapse of time of the input writing in step S914 and displays a result of the control in step S916. More specifically, the controller 110 may detect a position where the writing is currently made on the screen and may control the display such that an object in a partial area that is formed, based on the detected position, is differently displayed than an object in the remaining areas, i.e., outside of the partial area. The controller 110 may control object outputs in the remaining areas, based on the position at which the writing is currently made on the screen.

Further, the controller 110 may control the display such that the object output in the partial area that is formed, based on a position at which the writing is currently made on the screen, is displayed as being transparent or translucent.

Thereafter, in step S916, the screen may display a result of the control. For example, at least one of a size of the partial area and object output of the remaining areas may be controlled according to a distance between the input device and the screen and a touched position of the input device.

Referring to FIG. 10A, when the writing is made on a screen 1010, e.g., by using a touch or a hovering input, the controller 110 may detect a touched position between the input device 1030 and the screen 1010 to form a partial area 1012, which is based on the touched position, and control the screen to display the made writing in the partial area 1012.

Further, the controller 110 may control the screen 1010 to opaquely display the remaining area 1013, i.e., the area outside the partial area 1012.

When the partial area 1012 is formed, the controller 110 may control the display of the object. As described above, the controller 110 may control the partial area 1012 based on the position at which the touch or the hovering by the input device 1030 is detected. Due to such a control, the user may recognize that a gradation effect is provided to the partial area 1012 or an effect of distinguishing the areas is provided.

In FIG. 10A, the partial area 1012 is divided into a plurality of areas 1012*a* to 1012*d* by a transparency difference or a brightness difference. For example, a first partial area 1012*a* has a radius r1, a second partial area has a radius r2, a third partial area 1012*c* has a radius r3, and a fourth partial area has a radius r4. Further, the partial area 1012 may be divided into the plurality of areas 1012*a* to 1012*d* based on the position where the touch or the hovering by the input unit or the finger is detected, or the partial area 1012 may not be divided into the first to fourth areas 1012*a* to 1012*d* by applying gradation to the first to fourth partial areas. For example, the controller 110 may control the brightness by increasing the transparency in order to more clearly output an object in an area having a shorter radius (for example, the first area 1012*a* among the first to fourth areas 1012*a* to 1012*d*) and by reducing the transparency in order to make the object opaque or translucent in an area having a larger radius (for example, the fourth area 1012*d* among the first to fourth areas 1012*a* to 1012*d*). Further, the screen may be controlled such that the other area 1013 is shown to be opaque.

Referring to FIG. 10B, when the writing is made on a screen 1020, e.g., by using a touch or a hovering, the controller 110 may detect a touched position between the input device 1030 and the screen 1020 to form a partial area 1022 based on the touched position and control the screen to display the made writing in the partial area 1022.

Further, the controller 110 may control the screen 1020 to translucently display the remaining area 1023.

When the partial area 1022 is formed, the controller 110 may control the display of the object. As described above, the controller 110 may control the display of the object in the partial area 1022 that is based on the position at which the touch or the hovering by the input device 1030 is detected. Due to such a control, a gradation effect may be provided to the partial area 1022 or the user may recognize an effect of distinguishing the areas.

In FIG. 10B, the partial area 1022 is divided into a plurality of areas 1022*a* to 1022*d*. For example, a first partial area 1022*a* has a radius r1, a second partial area 1022*b* has a radius r2, a third partial area 1022*c* has a radius r3, and an fourth partial area 1022*d* has a radius r4. Further, the partial area 1022 may be divided into the plurality of areas 1022*a* to 1022*d* based on the position where the touch or the hovering by the input device 1030 is detected, or the partial area 1022 may not be divided into the first to fourth areas 1022*a* to 1022*d*, but uniform gradation may be applied. For example, the controller 110 may control the screen by controlling the transparency of the first area 1022*a* to be higher in order to more clearly output an object in an area having a shorter radius (for example, the first area 1022*a* among the first to fourth areas 1022*a* to 1022*d*) and controlling the transparency to be lower than that of the first area 1022*a* in an area having a larger radius (for example, the fourth area 1022*d* among the first to fourth areas 1022*a* to 1022*d*). Further, the other area 1023, i.e., outside the partial area 1022, may be controlled to be opaque.

Figure 11:
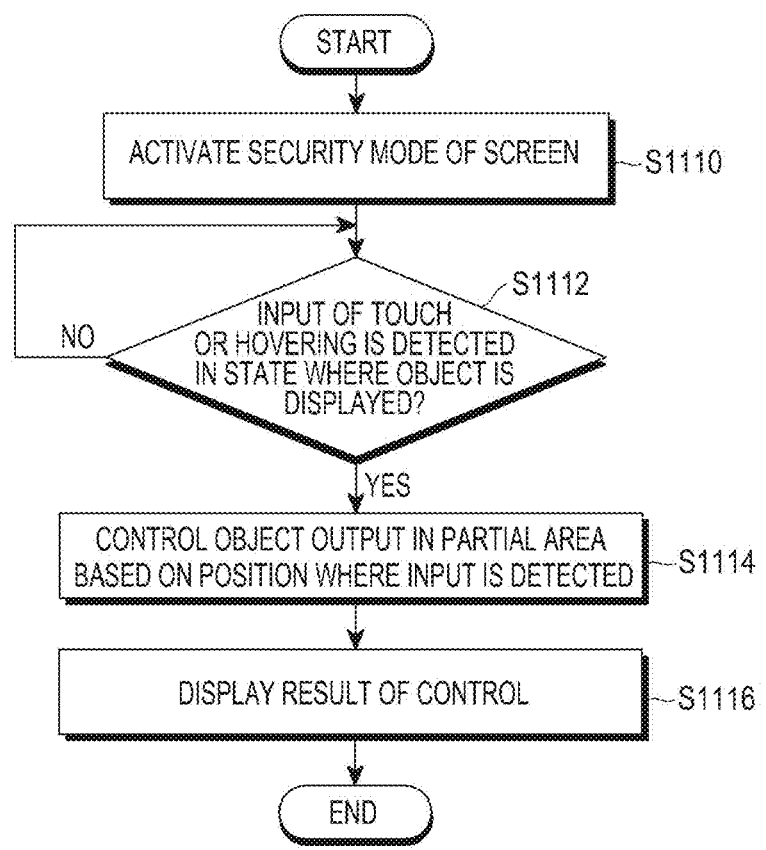
FIG. 11 is a flowchart illustrating a method of controlling an object output, based on a position at which a touch or a hovering is detected on a screen displaying a predetermined object, according to an embodiment of the present invention.

FIG. 11 is a flowchart illustrating a method of controlling an object output of a screen that is based on a position at which a touch or a hovering is detected on a screen displaying an object, according to an embodiment of the present invention.

Figure 12A:
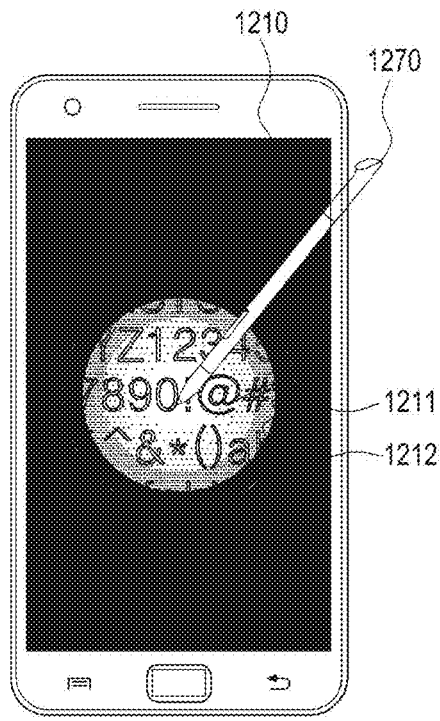
FIG. 12A illustrates an example of controlling an object output in a partial area formed, based on a position at which a touch or a hovering is detected on a screen displaying a predetermined object, according to an embodiment of the present invention.
Figure 12B:
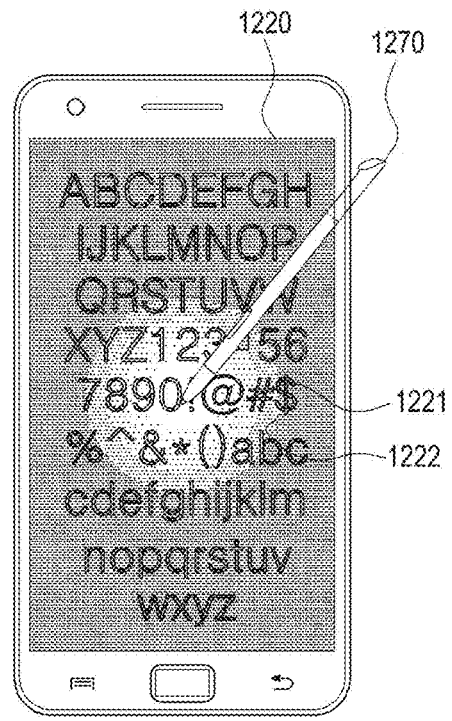
FIG. 12B illustrates another example of controlling an object output in a partial area formed, based on a position at which a touch or a hovering is detected on a screen displaying a predetermined object, according to an embodiment of the present invention.
Figure 12C:
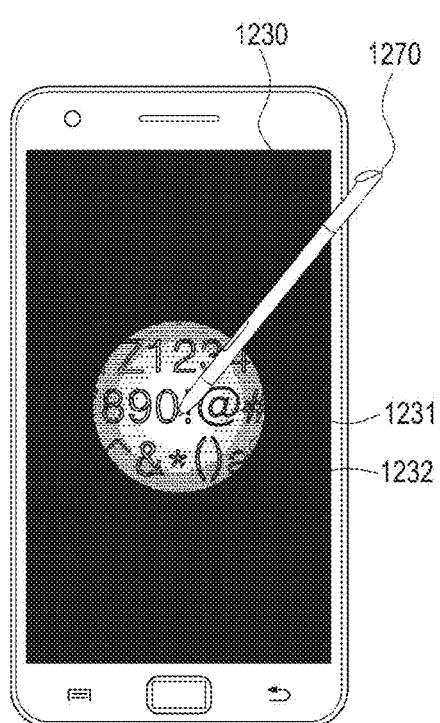
FIG. 12C illustrates an example of controlling a size of a partial area formed, based on a position at which a touch or a hovering is detected on a screen displaying a predetermined object, according to an embodiment of the present invention.
Figure 12D:
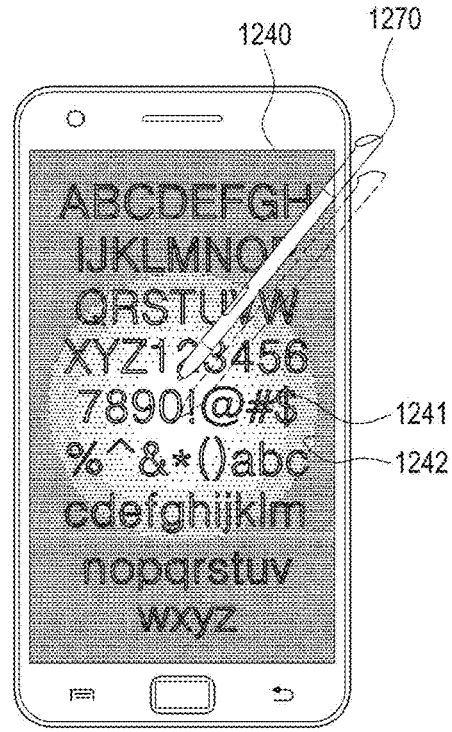
FIG. 12D illustrates another example of controlling a size of a partial area formed, based on a position at which a touch or a hovering is detected on a screen displaying a predetermined object, according to an embodiment of the present invention.
Figure 12E:
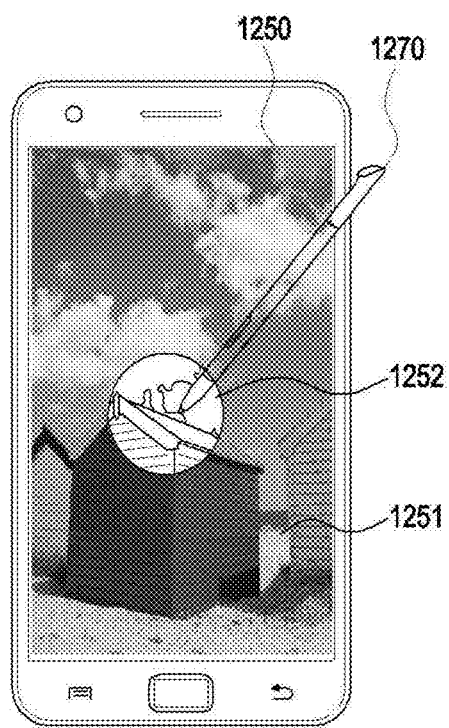
FIG. 12E illustrates an example of converting a partial area formed, based on a position at which a touch or a hovering is detected on a screen displaying a predetermined object, by applying a particular image filtering effect, according to an embodiment of the present invention.
Figure 12F:
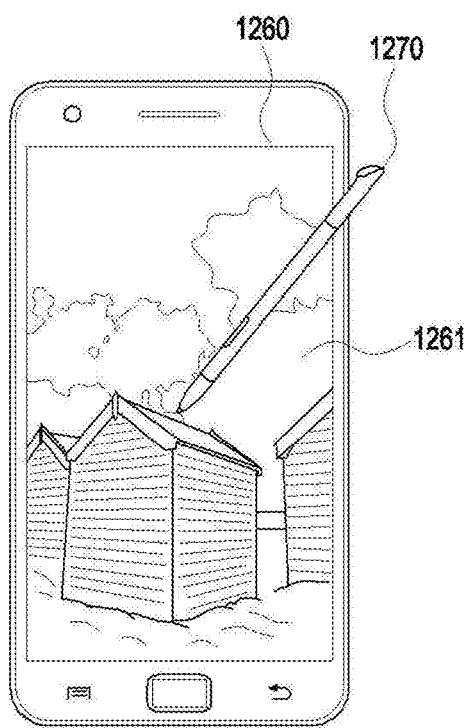
FIG. 12F illustrates an example of converting an object displayed in response to a detection of a touch or a hovering on a screen displaying a predetermined object, by applying a particular image filtering effect, according to an embodiment of the present invention.

FIGS. 12A to 12F illustrate examples of controlling an object output of a screen, based on a position at which an input is detected on the screen displaying an object, according to embodiments of the present invention. Specifically, FIG. 12A illustrates an example of controlling an object output in a partial area that is formed, based on a position at which a touch or a hovering is detected on a screen displaying an object, according to an embodiment of the present invention, FIG. 12B illustrates another example of controlling an object output in a partial area that is formed based on a position at which a touch or a hovering is detected on a screen displaying an object, according to an embodiment of the present invention, FIG. 12C illustrates an example of controlling a size of a partial area formed based on a position where a touch or a hovering is detected on a screen displaying a predetermined object according to an embodiment of the present invention, FIG. 12D illustrates another example of controlling a size of a partial area that is formed based on a position at which a touch or a hovering is detected on a screen displaying an object, according to an embodiment of the present invention, FIG. 12E illustrates an example of converting a partial area that is formed based on a position where a touch or a hovering is detected on the screen displaying an object by applying a particular image filtering effect, according to an embodiment of the present invention, and FIG. 12F illustrates an example of converting an object displayed in response to a detection of a touch or a hovering on a screen displaying an object by applying a particular image filtering effect according to an embodiment of the present invention.

Referring to FIG. 11, the portable terminal activates a security mode of the screen in step S1110. The operation of step S1110 is the same as described in steps S610 and S710, as described above. Accordingly, a repetitive description of step S1110 will not be provided.

When an input using a touch or a hovering is detected, while an object is displayed in step S1112, the controller controls the display of an object output in a partial area that is based on a position where the input is detected in step S1114 and displays a result of the control in step S1116. For example, the object displayed on the screen, which is confidential or that a user wants to be kept from being exposed to other people, includes a document, a widget, a picture, a news article, a map, a diary, a video, an email, an SMS message, and an MMS message. When a touch or a hovering using an input device is detected on the screen displaying the object, the controller 110 may form a partial area based on a position at which the touch or the hovering is detected, and display a part of the object in the formed partial area. Further, the controller 110 may control at least one of the object outputs in the partial area and the remaining area, i.e., the area outside of the partial area.

For example, when a touch or a hovering by an input device is detected while an object is opaquely displayed, the controller may control an object output such that a partial area corresponding to the touch or the hovering is transparently or translucently displayed.

Alternatively, when a touch or a hovering by an input device is detected while an object is transparently displayed, the controller may control an object output such that the remaining area except for the partial area corresponding to the partial area corresponding to the touch or the hovering is translucently or opaquely displayed.

Further, a gradation effect may be applied between the partial area and the remaining area, and a size of the partial area may be variably controlled according to a distance between the screen and the input device or preset in the security mode.

Further, the controller 110 may apply different colors to the partial area formed in response to the detection of the touch or the hovering by the input device while the object is displayed on the screen and the remaining area. For example, the controller 110 may detect a touch or a hovering using an input device on the screen displaying a color picture, convert a color of a partial area of the object to black and white, and display the converted object.

Referring to FIG. 12A, when a touch or a hovering using an input device 1270 is detected on an object displayed on the screen 1210, the controller 110 may detect a touched position between the input device 1270 and the screen 1210, and form a partial area 1211 based on the touched position. Further, the controller 110 may control an attribute of the formed partial area 1211 to display the object in the formed partial area 1211 differently from the object in the remaining area 1212, i.e., the area outside of the partial area 1211.

In addition, the controller 110 may display the object output by controlling the screen to translucently or transparently display the object included in the partial area 1211 and opaquely display the object included in the remaining area 1212. The partial area 1211 may be divided into the first to fourth areas 1012a to 1012d, as illustrated in FIG. 10A, or may have the gradation effect applied.

At least one of a size of the partial area 1211 and object outputs in the partial area 1211 and the remaining area 1212 may be configured in the security mode. The security mode may configure gradation between the partial area 1211 and the remaining area 1212. The controller 110 may configure the object output in the partial area by using at least one of a current position of the portable terminal, a time, ambient brightness, an ambient situation, and ambient noise, or the object output in the partial area may be controlled by the user.

Referring to FIG. 12B, when a touch or a hovering using the input device 1270 is detected on an object displayed on the screen 1220, the controller 110 may detect a touched position between the input device 1270 and the screen 1220, and form a partial area 1221 that is based on the touched position. The controller 110 may control an object output by controlling the screen or an attribute of the remaining areas to translucently display the remaining area 1222 and display a result of the control on the screen 1220. The partial area 1221 may be divided into the first to fourth areas 1022a to 1022d as illustrated in FIG. 10B or may have the gradation effect applied.

At least one of the object outputs in the partial area 1221 and the remaining area 1222 may be configured in the security mode. The security mode may configure gradation between the partial area 1221 and the remaining area 1222. The controller 110 may configure at least one of a size of the partial area and the object output by using at least one of a current position of the portable terminal, a time, ambient brightness, an ambient situation, and ambient noise, or at least one of the size of the partial area and the object output may be controlled by the user.

Referring to FIG. 12C, when a touch or a hovering using the input device 1270 is detected on an object displayed on the screen 1230, the controller 110 may detect a touched position or a hovering distance between the input device 1270 and the screen 1230, and form a partial area 1231 based on the touched position or the hovering position. The controller 110 may control an object output to opaquely display the remaining area 1232, i.e., outside the formed partial area 1231, and display the partial area 1231 having a controlled size on the screen 1230. The size of the partial area 1231 may become smaller as the input unit 1270 is closer to the screen and become larger as the input unit 1270 is further away from the screen. For example, the partial area 1231 illustrated in FIG. 12C is smaller than the partial area illustrated in FIG. 12A because a hovering distance between the screen 1230 and the input device 1270 in FIG. 12C is shorter than a hovering distance between the screen 1210 and the input device 1270 in FIG. 12A.

Further, the partial area 1231 may be divided into the first to fourth areas 1012a to 1012d or may have the gradation effect applied. At least one of a size of the partial area 1231 and object outputs in the partial area 1231 and the remaining area 1232 may be configured in the security mode. The security mode may configure gradation between the partial area 1231 and the remaining area 1232. The controller 110 may configure at least one of the size of the partial area and the object output by using at least one of a current position of the portable terminal, a time, ambient brightness, an ambient situation, and ambient noise, or at least one of the size of the partial area and the object output may be controlled by the user.

Referring to FIG. 12D, when a touch or a hovering using the input device 1270 is detected on an object displayed on the screen 1240, the controller 110 may detect or measure a touched position or a hovering distance between the input device 1270 and the screen 1240 and form a partial area 1241 based on the touched position or the hovering position. Further, the controller 110 may control an object output to translucently display the remaining area 1232.

In addition, the controller 110 controls a size of the partial area 1241 and displays the partial area 1241 having the controlled size on the screen 1240. The size of the partial area 1241 may become smaller as the hovering distance is shorter and become larger as the hovering distance is longer. For example, the partial area 1241 illustrated in FIG. 12D is larger than the partial area illustrated in FIG. 12B because the hovering distance between the screen 1240 and the input device 1270 in FIG. 12D is longer than the hovering distance between the screen 1220 and the input device 1270 in FIG. 12B.

The partial area 1241 may be divided into the first to fourth areas 1022a to 1022d as illustrated in FIG. 10B or may have the gradation effect applied.

At least one of the size of the partial area 1241 and object outputs in the partial area 1242 and the remaining area 1242 may be configured in the security mode. The security mode may configure gradation between the partial area 1241 and the remaining area 1242. The controller 110 may configure at least one of the size of the partial area and the object output by using at least one of a current position of the portable terminal, a time, ambient brightness, an ambient situation, and ambient noise, or at least one of the size of the partial area and the object output may be controlled by the user.

Referring to FIG. 12E, when a touch or a hovering using the input device 1270 is detected on an object (for example, picture) displayed on the screen 1250, the controller 110 may detect or measure a touched position or a hovering distance between the input device 1270 and the screen 1250.

Further, the controller 110 may form a partial area 1252 based on the touched position or the hovering position by using a result of the measurement and perform filtering of changing a color of the partial area 1252 to differentiate an image of the formed partial area 1252 from an image of the remaining area 1251, i.e., outside the partial area 1252.

The filtering may include a conversion to represent the partial area 1252 with a contour line, to blur the partial area 1252, to change a color of the partial area 1252, or to make the partial area 1252 clear. For example, when the displayed object corresponds to a color picture, the controller 110 may convert a color of the partial area 1252 to black and white or an image of the partial area 1252 to a contour line, and display the converted partial area 1252 on the screen 1250.

A size of the partial area 1252 may be displayed according to the hovering distance between the screen 1250 and the input unit 1270 or the finger. For example, the size of the partial area 1252 may become smaller as the hovering distance is shorter and become larger as the hovering distance is longer. Further, the size of the partial area 1252 may become larger as the hovering distance is shorter and become smaller as the hovering distance is longer. In addition, at least one of the size and shape of the partial area 1252 may be configured in the security mode or selectively applied by the user, and is variable. The shape of the partial area 1252 may include various forms of figures, such as a circle, an oval, a square, a rectangle and the like.

For example, the color of the partial area 1252 can be changed to black and white as described above, and, when a black and white picture is displayed, an image of the partial area 1252 formed by the input unit 1270 or the finger may be converted to a color image. The controller 110 may configure at least one of the size and the color of the partial area by using at least one of a current position of the portable terminal, a time, ambient brightness, an ambient situation, and ambient noise, or at least one of the size and the color of the partial area may be controlled by the user.

Referring to FIG. 12F, when a touch or a hovering using the input device 1270 is detected on an object 1261 (for example, picture) displayed on the screen 1260, the controller 110 may change a color the of the displayed object. For example, when the displayed object is a color image, the controller 110 may change the color image to a black and white image and display the black and white image on the screen 1260.

Alternatively, when the displayed object is a black and white image, the controller 110 may change the black and white image to a color image and display the color image on the screen 1260.

Further, when the color image is changed to the black and white image or the black and white image to the color image, the controller 110 may apply different color concentrations according to the hovering distance. For example, a deeper color is applied as the hovering distance is shorter and a lighter color is applied as the hovering distance is longer. Further, the controller 110 may configure the color change by using at least one of a current position of the portable terminal, a time, ambient brightness, an ambient situation, and ambient noise or the color change may be controlled by the user.

It may be appreciated that the embodiments of the present disclosure may be implemented in software, hardware, or a combination thereof. Any such software may be stored, for example, in a volatile or non-volatile storage device such as a ROM, a memory such as a RAM, a memory chip, a memory device, or an IC, or a optical or magnetic recordable and machine (e.g., computer) readable medium such as a CD, a DVD, a magnetic disk, or a magnetic tape, regardless of its ability to be erased or its ability to be re-recorded. It will be appreciated that a memory, which may be incorporated in a portable terminal, may be an example of a machine-readable storage medium which is suitable for storing a program or programs including commands to implement the exemplary embodiments of the present disclosure. Accordingly, the present invention includes a program that includes a code for implementing an apparatus or a method defined in any claim in the present specification and a machine-readable storage medium that stores such a program. Further, the program may be electronically transferred by a predetermined medium such as a communication signal transferred through a wired or wireless connection, and the present disclosure appropriately includes equivalents of the program.

Moreover, the above-described mobile terminal can receive the program from a program provision device which is connected thereto in a wired or wireless manner, and store the program. A program providing apparatus may include a program including instructions controlling the screen by the portable terminal, a memory for storing information required for controlling the screen, a communication unit for performing wired or wireless communication with the portable terminal, and a controller transmitting the corresponding program to a host device automatically or by a request of the portable terminal.

According to the above-described embodiments of the present invention, when a user is making an object or views an already made object by using an input device, an area at which a touch or a hovering is detected is formed, and the formed area is differently displayed from other areas. As a result, it is possible to protect privacy and also prevent light pollution to adjacent people in a dark place, thereby increasing the convenience.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

What is claimed is:

1. A method for protecting an object displayed on a touch screen of a portable terminal, the method comprising:
   activating a security mode based on analyzing an ambient situation around the portable terminal;
   displaying a trace based on a movement of a touch input by an input device on the touch screen while the security mode is activated;
   controlling the display of the trace such that the displayed trace sequentially disappears, wherein the trace includes a plurality of segments in which each of the plurality of segments sequentially disappears one at a time;
   identifying a hovering input by the input device on the trace which is disappearing sequentially;
   identifying a size of an area having a portion of the trace based on a position at which the hovering input is identified; and
   re-displaying the portion of the trace corresponding to the identified hovering input within the area having the identified size.

2. The method of claim 1, further comprising controlling an attribute of the area having the identified size.

3. The method of claim 2, wherein the attribute includes at least one of a size, a color, a brightness, or a gradation effect.

4. The method of claim 2, wherein the attribute of the area is differently controlled based on the identified position or a distance between the input device performing the hovering input and the touch screen.

5. The method of claim 1, further comprising, when the hovering input is identified while the object is displayed, displaying the area more translucent than an area outside of the area having the identified size.

6. The method of claim 1, further comprising, when the hovering input is identified while a picture is displayed, controlling a color of picture displayed within the area differently from a color of an area outside of the area.

7. The method of claim 1, wherein the area is moved based on a movement of the hovering input.

8. The method of claim 1, wherein the area has a radius based on the hovering input, and
   wherein, when the hovering input is identified, a size of the area is variably controlled based on a distance between a position at which the hovering input is identified and the touch screen.

9. The method of claim 1, further comprising, identifying the hovering input while the object is displayed on the touch screen, and applying an attribute of the object corresponding to the area identified based on the identified hovering input differently from an attribute of an object corresponding to an area outside of the identified area.

10. The method of claim 1,
    wherein the ambient situation includes at least one of a current position of the portable terminal, a time, ambient brightness, or ambient noise around the portable terminal.

11. A portable terminal for protecting an object displayed on a touch screen of the portable terminal, the portable terminal comprising:
    a touch screen; and
    at least one processor configured to:
       activate a security mode based on analyzing an ambient situation around the portable terminal,
       control the touch screen to display a trace based on a movement of a touch input by an input device on the touch screen while the security mode is activated,
       control the touch screen to control the display of the trace such that the displayed trace sequentially disappears, wherein the trace includes a plurality of segments in which each of the plurality of segments sequentially disappears one at a time,
       identify a hovering input by the input device on the trace which is disappearing sequentially,
       identify a size of an area having a portion of the trace based on a position at which the hovering input is identified,
       control the touch screen to re-display the portion of the trace corresponding to the identified hovering input within the area having the identified size.

12. The portable terminal of claim 11, wherein the at least one processor is further configured to control an attribute of the area having the identified size.

13. The portable terminal of claim 11, wherein the at least one processor is further configured to determine a size of the area based on a distance between the input device performing the hovering input and the touch screen.

14. The portable terminal of claim 11, wherein, when the hovering input is identified while the object is displayed, the at least one processor is further configured to display the identified area more translucent than an area outside of the identified area.

15. The portable terminal of claim 11, wherein, when the hovering input is identified while a picture is displayed on the touch screen, the at least one processor is further configured to control a color of the picture displayed within the area differently from a color of an area outside of the area.

16. A non-transitory computer-readable storage medium for storing instructions for a processor to protect an object displayed on a touch screen, which when executed by the processor, performs the instructions including:
- activating a security mode based on analyzing an ambient situation around the portable terminal;
- displaying a trace based on a movement of a touch input by an input device on the touch screen while the security mode is activated;
- controlling the display of the trace such that the displayed trace sequentially disappears, wherein the trace includes a plurality of segments in which each of the plurality of segments sequentially disappears one at a time;
- identifying a hovering input by the input device on the trace which is disappearing sequentially;
- identifying a size of an area having a portion of the trace based on a position at which the hovering input is identified;
- re-displaying the portion of the trace corresponding to the identified hovering input within the area having the identified size.

17. The method of claim 1, wherein a peripheral part of the re-displayed portion of the trace is more transparent than a central part of the re-displayed portion of the trace.

* * * * *